(12) United States Patent
Woo

(10) Patent No.: US 12,744,555 B2
(45) Date of Patent: Sep. 22, 2026

(54) APPARATUS AND METHOD FOR SIGNAL COMPENSATION IN WIRELESS COMMUNICATION SYSTEM

(71) Applicant: Samsung Electronics Co., Ltd., Suwon-si (KR)

(72) Inventor: Youngyoon Woo, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 293 days.

(21) Appl. No.: 18/653,314

(22) Filed: May 2, 2024

(65) Prior Publication Data

US 2024/0283472 A1 Aug. 22, 2024

Related U.S. Application Data

(63) Continuation of application No. PCT/KR2022/020428, filed on Dec. 15, 2022.

(30) Foreign Application Priority Data

Dec. 24, 2021 (KR) ........................ 10-2021-0187643
Jan. 14, 2022 (KR) ........................ 10-2022-0005919

(51) Int. Cl.
*H04B 1/04* (2006.01)
*H04L 5/14* (2006.01)

(52) U.S. Cl.
CPC ................ *H04B 1/04* (2013.01); *H04L 5/14* (2013.01); *H04B 2001/0425* (2013.01)

(58) Field of Classification Search
CPC ...... H04B 1/04; H04B 2001/0425; H04L 5/14
See application file for complete search history.

(56) References Cited

U.S. PATENT DOCUMENTS 6,011,434 A 1/2000 Sakai
6,600,368 B2 7/2003 Kim
(Continued)

FOREIGN PATENT DOCUMENTS

KR 10-2005-0041481 A 5/2005
KR 10-0798399 B1 1/2008
(Continued)

OTHER PUBLICATIONS

Korean Office Action dated Jan. 26, 2026, issued in Korean Application No. 10-2022-0005919.
(Continued)

*Primary Examiner* — Raymond S Dean
(74) *Attorney, Agent, or Firm* — Jefferson IP Law, LLP

(57) ABSTRACT

The disclosure relates to a $5^{th}$ generation (5G) or pre-5G communication system for supporting a data transmission rate higher than that of a $4^{th}$ generation (4G) communication system such as long-term evolution (LTE). A method performed by a base station in a wireless communication system is provided. The method includes acquiring, by the base station, a first output signal of digital predistortion (DPD), identifying, by the base station, a distortion section from the starting point of a downlink section after an uplink section has ended in a time division duplex (TDD) configuration, identifying, by the base station, compensation information for a power amplifier of a base station in the distortion section, and providing, by the base station, a signal in which the compensation information is applied to a second output signal of the DPD to the power amplifier.

20 Claims, 16 Drawing Sheets

(56) References Cited

U.S. PATENT DOCUMENTS

| | | | | |
|---|---|---|---|---|
| 7,039,124 | B2 | 5/2006 | Lee | |
| 8,204,454 | B2 | 6/2012 | Yamaoka et al. | |
| 8,737,526 | B2 | 5/2014 | Coan et al. | |
| 9,337,886 | B1 * | 5/2016 | Dick | H03F 1/3241 |
| 9,654,058 | B2 | 5/2017 | Martynovich et al. | |
| 10,097,141 | B1 * | 10/2018 | Almog | H04B 1/0475 |
| 2005/0009479 | A1 | 1/2005 | Braithwaite | |
| 2005/0069050 | A1 | 3/2005 | Ding et al. | |
| 2007/0129032 | A1 | 6/2007 | Matsuura et al. | |
| 2009/0072900 | A1 | 3/2009 | Park et al. | |
| 2014/0292403 | A1 | 10/2014 | Liu et al. | |
| 2016/0065250 | A1 * | 3/2016 | Volokhine | H03F 1/3247 375/297 |
| 2016/0308577 | A1 * | 10/2016 | Molina | H04L 27/368 |
| 2017/0244582 | A1 * | 8/2017 | Gal | H04L 25/03885 |
| 2018/0351619 | A1 * | 12/2018 | Khan | H04B 7/0897 |
| 2019/0208541 | A1 * | 7/2019 | Lee | H04W 72/0453 |

FOREIGN PATENT DOCUMENTS

| | | | |
|---|---|---|---|
| KR | 10-2009-0020659 | A | 2/2009 |
| KR | 10-2009-0029351 | A | 3/2009 |
| KR | 10-2009-0097295 | A | 9/2009 |
| KR | 10-2014-0122475 | A | 10/2014 |

OTHER PUBLICATIONS

International Search Report dated Mar. 29, 2023, issued in International Patent Application No. PCT/KR2022/020428.

Korean Office Action dated Aug. 1, 2026, issued in Korean Application No. 10-2022-0005919.

* cited by examiner

APPARATUS AND METHOD FOR SIGNAL COMPENSATION IN WIRELESS COMMUNICATION SYSTEM

CROSS-REFERENCE TO RELATED APPLICATION(S)

This application is a continuation application, claiming priority under § 365(c), of an International application No. PCT/KR2022/020428, filed on Dec. 15, 2022, which is based on and claims the benefit of a Korean patent application number 10-2021-0187643, filed on Dec. 24, 2021, in the Korean Intellectual Property Office, and of a Korean patent application number 10-2022-0005919, filed on Jan. 14, 2022, in the Korean Intellectual Property Office, the disclosure of each of which is incorporated by reference herein in its entirety.

BACKGROUND

1. Field

The disclosure relates to a wireless communication system. More particularly, the disclosure relates to an apparatus and a method for signal compensation in a wireless communication system.

2. Description of Related Art

To meet the demand for wireless data traffic having increased since deployment of 4$^{th}$ generation (4G) communication systems, efforts have been made to develop an improved 5$^{th}$ generation (5G) or pre-5G communication system. Therefore, the 5G or pre-5G communication system is also called a 'Beyond 4G Network' or a 'Post LTE System'.

The 5G communication system is considered to be implemented in higher frequency (mmWave) bands, e.g., 28 giga hertz (GHz) or 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems.

In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like.

In the 5G system, Hybrid FSK and quadrature amplitude modulation (QAM) Modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

In a wireless communication system, a base station may transmit a downlink signal to a terminal. In addition, as a method for transmitting an uplink signal and a downlink signal between a base station and a terminal, frequency division duplex (FDD) and time division duplex (TDD) may be used. In a TDD system, a digital pre-distorter (DPD) may be used to minimize a distortion component of a signal outputted from a power amplifier.

In addition, there is a need for an operating method for solving distortion characteristics of a gain and a phase of a power amplifier, which are attributable to a thermal diffusion state, to improve an error vector size of a signal and to guarantee communication quality in relation to performance improvement of a DPD.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide an apparatus and a method for transmitting a downlink signal based on compensation information of a power amplifier in a wireless communication system.

Another aspect of the disclosure is to provide an apparatus and a method for identifying a distortion period in a transmission period of a downlink signal transmitted by a base station in a wireless communication system.

Another aspect of the disclosure is to an apparatus and a method for identifying compensation information for a power amplifier in a distortion period in a wireless communication system.

Another aspect of the disclosure is to provide an apparatus and a method for applying identified compensation information to an output signal of a digital pre-distorter (DPD) and transmitting a downlink signal in a wireless communication system.

Additional aspects will be set forth in part in the description which follows and, in part, will be apparent from the description, or may be learned by practice of the presented embodiments.

In accordance with an aspect of the disclosure, a method performed by a base station in a wireless communication system is provided. The method includes acquiring, by the base station, a first output signal of digital predistortion (DPD), after an uplink period is ended in a time division duplex (TDD) configuration, identifying, by the base station, a distortion period from a start time of a downlink period, identifying, by the base station, compensation information for a power amplifier of the base station in the distortion period, and providing, by the base station, a signal in which the compensation information is applied to a second output signal of the DPD to the power amplifier.

According to an embodiment of the disclosure, to identify the distortion period from the start time of the downlink period, the method, performed by the base station in the wireless communication system, may further include detecting a temperature of the power amplifier and a temperature change amount, identifying whether the detected temperature change amount is less than or equal to a threshold value, and, when the detected temperature change amount is less than or equal to the threshold value, identifying a period from the start time of the downlink period to a time at which the temperature change amount reaches the threshold value, as the distortion period.

According to an embodiment of the disclosure, to identify the compensation information for the power amplifier of the base station in the distortion period, the method, performed by the base station in the wireless communication system, may further include identifying a change amount of at least one of a gain or a phase per unit time in the distortion period, identifying the compensation information based on the change amount of at least one of the gain or phase per the unit time, and providing the identified compensation information to the DPD.

According to an embodiment of the disclosure, a base station device in a wireless communication system is provided. The base station device includes at least one transceiver, memory storing one or more computer programs, and one or more processors communicatively coupled with the at least one transceiver and the memory, wherein the one or more computer programs include computer-executable instructions that, when executed by the one or more processors, cause the base station device to acquire a first output signal of DPD, after an uplink period is ended in a time division duplex (TDD) configuration, identify a distortion period from a start time of a downlink period, identify compensation information for a power amplifier of the base station in the distortion period, and provide a signal in which the compensation information is applied to a second output signal of the DPD to the power amplifier.

According to an embodiment of the disclosure, to identify the distortion period from the start time of the downlink period, the one or more computer programs further include computer-executable instructions that, when executed by the one or more processors, cause the base station device to detect a temperature of the power amplifier and a temperature change amount, identify whether the detected temperature change amount is less than or equal to a threshold value, and, when the detected temperature change amount is less than or equal to the threshold value, identify a period from the start time of the downlink period to a time at which the temperature change amount reaches the threshold value, as the distortion period.

According to an embodiment of the disclosure, to identify the compensation information for the power amplifier of the base station device in the distortion period, the one or more computer programs further include computer-executable instructions that, when executed by the one or more processors, cause the base station device to identify a change amount of at least one of a gain or a phase per unit time in the distortion period, identify the compensation information based on the change amount of at least one of the gain or phase per the unit time, and provide the identified compensation information to the DPD.

In accordance with another aspect of the disclosure, one or more non-transitory computer-readable storage media storing one or more computer programs including computer-executable instructions that, when executed by one or more processors of a base station, cause the base station to perform operations are provided. The operations include acquiring, by the base station, a first output signal of digital predistortion (DPD), after an uplink period is ended in a time division duplex (TDD) configuration, identifying, by the base station, a distortion period from a start time of a downlink period, identifying, by the base station, compensation information for a power amplifier of the base station in the distortion period, and providing, by the base station, a signal in which the compensation information is applied to a second output signal of the DPD to the power amplifier.

According to the apparatus and the method according to embodiments of the disclosure, downlink signal transmission may be performed based on compensation information of a power amplifier, so that performance degradation caused by deterioration of the power amplifier may be prevented.

According to the apparatus and the method according to embodiments of the disclosure, downlink signal transmission may be performed based on compensation information of a power amplifier, so that performance degradation of a digital pre-distorter (DPD) may be minimized and quality of a downlink transmission signal may be improved.

Other aspects, advantages, and salient features of the disclosure will become apparent to those skilled in the art from the following description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1:
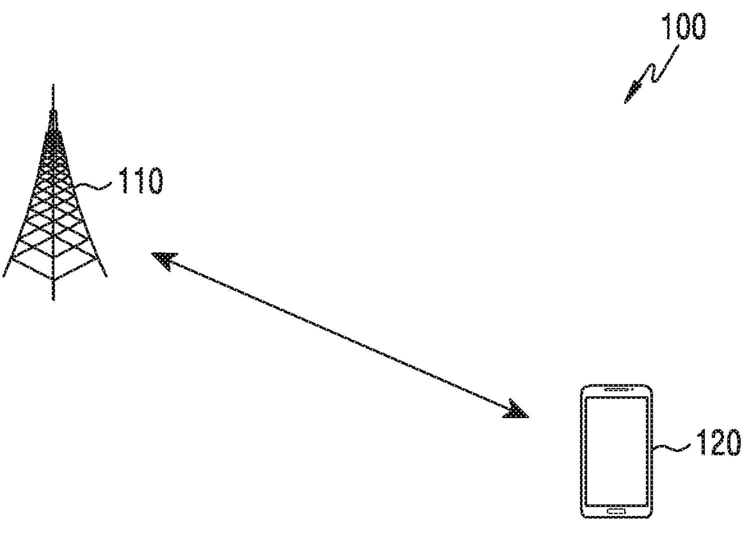
FIG. 1 illustrates an example of a wireless communication environment according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms “a,” “an,” and “the” include plural referents unless the context clearly dictates otherwise. Thus, for example, reference to “a component surface” includes reference to one or more of such surfaces.

In various embodiments of the disclosure described below, hardware-wise approach methods will be described by way of an example. However, various embodiments of the disclosure include technology using both hardware and software, and thus do not exclude software-based approach methods.

Preferred embodiments of the disclosure will be described in detail with reference to the accompanying drawings. It should be noted that the same components are indicated by the same reference numerals in the accompanying drawings. In addition, detailed descriptions of well-known functions and configurations will be omitted since they would unnecessarily obscure the subject matters of the disclosure.

In explaining embodiments, descriptions of technology contents that are well known in the technical field to which the disclosure belongs, and are not directly related to the disclosure will be omitted. This is to convey the subject matters of the disclosure more clearly without obscuring, by omitting redundant explanations.

For the same reasons, some components in the accompanying drawings may be exaggerated, omitted, or schematically illustrated. In addition, the size of each component does not completely reflect a real size. The same reference numerals are used for the same or corresponding components in each drawing.

The advantages and features of the disclosure, and methods for achieving the same will be apparent by referring to embodiments, which will be described below in detail along with the accompanying drawings. However, the disclosure is not limited to embodiments disclosed hereinbelow, and may be embodied in many different forms. Embodiments disclosed hereinbelow are provided only to make the disclosure thorough and complete and fully convey the scope of the disclosure to those of ordinary skill in the art, and the disclosure may be defined only by the scope of the appended claims. Throughout the specification, the same reference numerals indicate the same components.

It will be understood that each block in the drawing showing process flowcharts and combinations of the process flowcharts may be performed by computer program instructions. The computer program instructions may be loaded into a processor of a generic-purpose computer, a special computer, or other programmable data processing equipment. Therefore, the instructions performed by the processor of the computer or other programmable data processing equipment may generate a means for performing functions explained in the block(s) of the flowcharts. The computer program instructions may be stored in computer-usable or computer-readable memory which is directed at a computer or other programmable data processing equipment in order to implement a function in a specific method. Accordingly, the instructions stored in the computer-usable or computer-readable memory may produce a manufacturing item including an instruction means for performing functions explained in the block(s) of the flowcharts. The computer program instructions may be loaded on a computer or other programmable data processing equipment. Accordingly, a series of operation steps may be performed on the computer or other programmable data processing equipment to generate a process to be executed by the computer, and the instructions performing the computer or other programmable data processing equipment may provide steps for executing functions explained in the block(s) of the flowcharts.

In addition, each block may indicate a part of a module, a segment or a code including one or more executable instructions for executing a specified logical function(s). It should be noted that, in some alternative examples, functions mentioned in blocks may be performed irrespective of an order. For example, two blocks which are successively illustrated may be performed substantially at the same time, or may be performed in the inverse order according to their corresponding functions.

The term “unit” used in the various embodiments refers to a software component or a hardware component such as a field programmable gate array (FPGA) or an application specific integrated circuit (ASIC), and the “unit” performs a certain role. However, the “unit” is not limited to software or hardware, The “unit” may be configured to exist in a storage medium which may address, and may be configured to reproduce one or more processors. For example, the “unit” may include components such as software components, object-oriented software components, class components and task components, and processes, functions, attributes, procedures, sub-routines, segments of a program code, drivers, firmware, microcode, circuit, data, database, data structures, tables, arrays, and variables. Functions provided in the components and the “units” may be coupled with fewer components and “units” or may further be divided into additional components and “units.” In addition, the components and the “units” may be implemented to reproduce one or more central processing units (CPUs) in a device or a security multimedia card.

The disclosure described hereinbelow relates to an apparatus and a method for enhancing quality of a downlink transmission signal by minimizing reduction of performance of a digital pre-distorter (DPD) by applying compensation information in a wireless communication system.

Specifically, the disclosure describes a technology for solving nonlinearity by reducing distortion characteristics caused by thermal diffusion in a power amplifier by identifying and applying compensation information of a gain and a phase related to a distortion period in a wireless communication system.

As used in explanations of the above-described technology, terms indicating types of signals (e.g., control information, beam information, a control signal, a data signal, a control channel, a data channel a synchronization signal, a synchronization block, system information), terms indicating network entities (e.g., a repeater device, a base station, a terminal), terms related to time resources (e.g., a symbol, a slot, a subframe, a radio frame), terms related to frequency resources (e.g., a resource element (RE), a resource block (RB), a bandwidth part (BWP), a band width (BW), a carrier), terms related to signals (e.g., a RS, a symbol, information), terms related to signal processing (e.g., encoding/decoding, channel coding, scrambling, modulation, IFFT/FFT, cyclic prefix (CP) insertion/deletion), terms indicting components of a device (e.g., a communication unit, a RF unit, a beamforming unit) are merely examples for convenience of explanation. Accordingly, the disclosure is not limited to the terms described below, and other terms having the same technical meanings may be used.

In addition, various embodiments will be described by using terms used in some communication standards (e.g., $3^{rd}$ generation partnership project (3GPP)), but these are merely an example for explanation. Various embodiments of the disclosure may be easily modified and applied to other communication systems.

Technologies described hereinbelow may be used in various radio access systems such as code division multiple access (CDMA), frequency division multiple access (FDMA), time division multiple access (TDMA), orthogonal frequency division multiple access (OFDMA), single carrier frequency division multiple access (SC-FDMA), or the like. CDMA may be implemented by radio technology such as universal terrestrial radio access (UTRA) or CDMA2000. TDMA may be implemented by radio technology such as global system for mobile communications (GSM), general packet radio service (GPRS) or enhanced data rates for GSM evolution (EDGE). OFDMA may be implemented by radio technology such as IEEE 802.11 (that is, Wi-Fi), IEEE 802.16 (that is, WiMAX), IEEE 802-20, evolved UTRA (E-UTRA). 3GPP NR will be mainly described for the sake of clear explanation of the disclosure, but the technical concept of the disclosure is not limited thereto.

Beyond the initial function of providing a voice-oriented service, wireless communication systems are developing into broadband wireless communication systems which provide a packet data service of high-speed, high quality like communication standards, such as high speed packet access (HSPA) of 3GPP, long term evolution (LTE) or evolved universal terrestrial radio access (E-UTRA), LTE-Advanced (LTE-A), LTE-Pro, high rate packet data (HRPD) of 3GPP2, ultra mobile broadband (UWB), and 802.16e of IEEE.

In an LTE system, which is a representative example of the above-described broadband wireless communication system, an orthogonal frequency division multiplexing (OFDM) scheme may be employed in downlink (DL), and a single carrier-frequency division multiple access (SC-FDMA) scheme may be employed in uplink (UL). The uplink refers to a wireless link through which a terminal (user equipment (UE) or a mobile station (MS)) transmits data or a control signal to a base station (eNode B or a base station (BS)), and the downlink refers to a wireless link through which a base station transmits data or a control signal to a terminal. In addition, the downlink may refer to transmission via a repeater device between a base station and a terminal. The above-described multiple access schemes may assign and manage time-frequency resources for carrying and transmitting data or control information for each user not to overlap one another, that is, to establish orthogonality, and thereby distinguish data or control information of each user.

A 5G (or NR) communication system which is a post-LTE communication system should support a service satisfying various requirements simultaneously so as to freely reflect various requirements of a user and a service provider. Services which are considered for the 5G communication system may include enhanced mobile broadband (eMBB), massive machine type communication (mMTC), ultra-reliability low latency communication (URLLC).

eMBB aims at providing a high data transmission speed which is more enhanced in comparison to a data transmission speed supported by existing LTE, LTE-A, or LTE-Pro. For example, in a 5G communication system, eMBB should be able to provide a peak data rate of 20 Gbps in downlink and to provide a peak data rate of 10 Gbps in uplink from the point of view of one base station. In addition, the 5G communication system should provide an increased user perceived data rate of a terminal, while providing a peak data rate. In order to meet the requirements described above, there may be a request for enhancement of various transmission and reception technologies including an enhanced multi input multi output (MIMO) transmission technology. In an LTE system, signals are transmitted by using a maximum transmission bandwidth of 20 MHz in a 20 GHz band. On the other hand, in a 5G communication system, a frequency bandwidth larger than 20 MHz is used in a frequency band of 3-6 GHz or 6 GHz or more, so that a data transmission rate required in the 5G communication system may be satisfied.

At the same time, mMTC is considered to support an application service such as Internet of thing (IoT) in a 5G communication system. mMTC may require support of access by massive terminals within a cell, enhanced coverage of a terminal, an increased battery time, reduction in a cost of a terminal in order to provide IoT efficiently. Since IoT is attached to various sensors and various devices to provide a communication function, IoT should be able to support many terminals (e.g., 1,000,000 terminals/km2) within a cell. In addition, since terminals supporting mMTC are likely to be positioned in a shaded area that is not covered by a cell, such as a basement of a building, due to characteristics of a service, the service of mMTC may require a broader coverage compared to other services provided by the 5G communication system. Since terminals supporting mMTC should be configured with low-priced terminals, and there may be difficulty in replacing a battery of a terminal frequently, there may be a need for a long battery life time, for example, a battery life of 10-15 years.

Lastly, URLLC is a cellular-based wireless communication service which is used for a specific purpose (mission-critical). For example, services used for remote control of a robot or a machinery, industrial automation, an unmanned aerial vehicle, remote health care, an emergency alert may be considered. Accordingly, communication provided by URLLC should provide very low latency and very high reliability. For example, services supporting URLLC should satisfy air interface latency shorter than 0.5 millisecond, and simultaneously, should satisfy requirements of a packet error rate of $10^{-5}$ or less. Accordingly, the 5G system should provide a shorter transmit time interval (TTI) than other services in order to provide a service supporting URLLC, and simultaneously, may need to meet design requirements to allocate broad resources in a frequency band in order to guarantee reliability of a communication link.

The three services considered in 5G communication systems, that is, eMBB, URLLC, mMTC, may be multiplexed in one system and may be transmitted. In this case, in order to satisfy different requirements of respective services, different transceiving techniques and transceiving parameters may be used between services.

In addition, in the disclosure, the expression "exceeding" or "being less than" may be used to determine whether a specific condition is satisfied, fulfilled, but these are just for expressing one example and do not exclude the expression "being greater than or equal to" or "being less than or equal to". The condition described by "being greater than or equal to" may be substituted with "exceeding", the condition described by "being less than or equal to" may be substituted with "being less than", and the condition described by "being greater than or equal to and less than" may be substituted with "exceeding and less than or equal to".

The disclosure relates to a wireless communication system, and more particularly, to a method for transmitting a downlink signal of a base station. In a wireless communication system, as a method for transmitting an uplink signal and a downlink signal between a base station and a mobile terminal, frequency division duplex (FDD) in which signals are transmitted through different frequencies, and time division duplex (TDD) in which signals are transmitted at different times in the same frequency band may be used.

In a next-generation mobile communication system (5G), which is being standardized in recent years, dynamic TDD is introduced to support various requirements of users such as ultra-high speed, ultra-low latency, hyper-connection services. In a TDD communication method of an existing mobile communication system (long term evolution (LTE)), an uplink signal and a downlink signal may be changed at least in the unit of a subframe (1 ms). Although there is a limit to the number of configuration options of uplink and downlink, a ratio of an uplink signal and a downlink signal in a next-generation mobile communication system may be changed in the unit of an orthogonal frequency division multiplexing (OFDM) symbol (e.g., 35.71 μs), which is smaller than a subframe. In addition, the next-generation mobile communication system may change the uplink and downlink configuration more flexibly and dynamically.

Accordingly, by applying the dynamic TDD communication scheme, the next-generation mobile communication system may adaptively adjust an uplink and downlink symbol ratio according to an uplink and downlink traffic ratio by time. In addition, the next-generation mobile communication system may flexibly provide 5G services to various users by changing configurations of uplink and downlink symbols immediately according to required quality of service (QoS) of a user, such as ultra-high speed, ultra-low latency services.

Meanwhile, a TDD communication system may perform communication by using a plurality of subframes. The TDD communication system may include a configuration in which at least one downlink symbol and at least one uplink symbol are arranged in the unit of a subframe. In addition, each configuration may include a guard period (GP) between at least one downlink symbol and at least one uplink symbol.

A power amplifier may be installed at a final end of a transmitter of a communication device. Typically, the power amplifier may have nonlinearity characteristics, causing an output signal to be distorted. Accordingly, the whole performance of the transmitter may be degraded due to deterioration. In order to efficiently remove the nonlinearity characteristics of the power amplifier described above, the communication device may use a digital pre-distorter (DPD). By using the digital pre-distorter, a size gain and a phase gain of the power amplifier according to a size of an input signal may be constantly maintained, so that the performance of the transmitter may be improved. Specifically, the digital pre-distorter may compare an input signal and an output signal to achieve linearity of the power amplifier. The digital pre-distorter may minimize a distortion component of an output signal through a DPD block, so that an input modulation signal may be linearly amplified. A correction algorithm for extracting a distortion component of the power amplifier and forming a DPD block may be applied. In order to perform the correction algorithm, an input signal representing all signals and an output signal to the input signal may be required.

When conversion from an uplink symbol to a downlink symbol period is performed by the TDD communication method, the temperature of each element of the power amplifier may change. Such a change in the temperature of an element may cause an additional nonlinear distortion characteristic. The change in the temperature of the element of the power amplifier may cause a change in a gain and a phase of a downlink signal. In particular, in the case of a predetermined period after a downlink period start time at which a stabilization period by thermal equilibrium is not reached, linearization by a pre-distortion method is not normally applied, and thus, error vector magnitude (EVM) performance may deteriorate.

To solve the above problems, the disclosure aims at solving distortion characteristics of a gain and a phase, which are attributable to a thermal propagation state during a predetermined period after a downlink period start time, with respect to a power amplifier used in a related-art TDD communication system. Embodiments of the disclosure may improve an error vector magnitude of a signal and may guarantee communication quality.

It should be appreciated that the blocks in each flowchart and combinations of the flowcharts may be performed by one or more computer programs which include instructions. The entirety of the one or more computer programs may be stored in a single memory device or the one or more computer programs may be divided with different portions stored in different multiple memory devices Any of the functions or operations described herein can be processed by one processor or a combination of processors. The one processor or the combination of processors is circuitry performing processing and includes circuitry like an application processor (AP, e.g. a central processing unit (CPU)), a communication processor (CP, e.g., a modem), a graphics processing unit (GPU), a neural processing unit (NPU) (e.g., an artificial intelligence (AI) chip), a Wi-Fi chip, a Bluetooth® chip, a global positioning system (GPS) chip, a near field communication (NFC) chip, connectivity chips, a sensor controller, a touch controller, a finger-print sensor controller, a display drive integrated circuit (IC), an audio CODEC chip, a universal serial bus (USB) controller, a camera controller, an image processing IC, a microprocessor unit (MPU), a system on chip (SoC), an integrated circuit (IC), or the like.

FIG. 1 illustrates an example of a wireless communication environment according to an embodiment of the disclosure.

Referring to FIG. 1, a base station 110 and a terminal 120 are illustrated as part of nodes using a wireless channel in a wireless communication system. The terminal 120 may be connected with a plurality of base stations. Although not shown in FIG. 1, base stations may be connected with the terminal 120 through multiple connectivity (e.g., dual connectivity (DC)).

The base station 110 may be a network infrastructure that provides radio access to the terminal 120. The base station 110 may have a coverage that is defined as a predetermined geographical region based on a distance by which it transmits a signal. The term 'coverage' used hereinbelow may indicate a service coverage area of the base station 110. The base station 110 may cover one cell or may cover multiple cells. The multiple cells may be distinguished by a supported frequency, an area of a covered sector.

The base station 110 may be referred to as "access point (AP)," "eNodeB (eNB)," "5th generation (5G) node," "5G NodeB," "next generation node B (gNB)," "wireless point," "transmission/reception point (TRP)," "distributed unit (DU)," "radio unit (RU)," "remote radio head (RRH)," or other terms having the same technical meaning as the above-mentioned terms, in addition to the base station. According to various embodiments, the base station 110 may be connected with one or more "transmission/reception points (TRP)." The base station 110 may transmit a downlink signal to the terminal 120 or may receive an uplink signal through the one or more TRPs.

The terminal 120 is a device that is used by a user, and may perform communication with the base station 110 through a wireless channel. In some cases, the terminal 120 may be operated without user's intervention. That is, at least one of the terminals 120 may be a device which performs machine type communication (MTC), and may not be carried by a user. The terminal 120 may be referred to as "user equipment (UE)," "mobile station," "subscriber station," "customer premises equipment (CPE)," "remote terminal," "wireless terminal," "electronic device," "terminal for vehicles," "user device", or other terms having the same technical meaning as the above-mentioned terms, in addition to the terminal.

Various embodiments of the disclosure disclose a method and an apparatus for operating based on a configuration of a TDD communication system. A specific method for uplink and downlink signal transmission in a TDD communication system will be described.

A carrier aggregation (CA) technology was introduced in 3GPP standard release 10. CA is a technology whereby a terminal is connected to a homogeneous wireless communication cell group having a common radio resource control entity, and uses frequency resources on component carriers of cells positioned in different frequency bands, simultaneously, in transmitting and receiving signals, thereby improving frequency usage efficiency of a terminal 120 and a base station 110. A dual connectivity (DC) technology, which is a kind of multiple connectivity, was introduced from 3rd generation partnership project (3GPP) standard release 12. Dual connectivity is a technology whereby a terminal is connected with two independent heterogeneous or homogeneous wireless communication cell groups having a separate radio resource control entity, simultaneously, and uses frequency resources on component carriers of cells in cell groups positioned in different frequency bands in transmitting and receiving signals, thereby improving frequency usage efficiency of a terminal and a base station 110. The dual connectivity may include a master cell group in which a control plane is directly connected to a core network to manage a radio resource control state of a terminal, and a secondary cell group which is associated with the master cell group.

Due to the technical advantage of increasing efficiency in using restricted wireless communication resources of a terminal and wireless communication resources of a base station, many studies are being done on the dual connectivity technology and the carrier aggregation technology from the academic perspective. In particular, since a 5G mobile communication system is basically operated in a non-standalone mode to operate in association with a 4G core network, the dual connectivity and the carrier aggregation are used as a core technology in commercial services supporting 5G mobile communication systems.

Communication nodes (e.g., a terminal, a base station 110, an entity of a corer network) according to various embodiments of the disclosure may operate in a NR system. In addition, communication nodes (e.g., a terminal, a base station 110, an entity of a core network) according to various embodiments of the disclosure may operate all together in an LTE system.

In a 5G system, when a base station 110 transceives data with a terminal 120, a coverage may be restricted due to attenuation of a propagation path according to an increasing frequency band (e.g., 6 GHz or higher band, particularly, an mmWave band). The problem caused by restriction of the coverage may be solved by densely arranging a plurality of relays (or relay nodes) between propagation paths of the base station 110 and the terminal 120. However, a problem of a cost for installing optical cables for backhaul connection between relays may arise. Accordingly, instead of installing optical cables between relays, radio frequency resources of a broad band available in mmWave may be used to transceive backhaul data between relays, so that the problem of a cost for installing optical cables may be solved and an mmWave band may be more effectively used.

The wireless communication environment may be a wireless environment supporting a TDD system. In the wireless communication environment, uplink transmission and downlink transmission may be divided by time according to a TDD communication method. A resource structure for a TDD communication method will be described. A TDD frame may include a UL subframe for uplink (UL) transmission and a DL subframe for downlink (DL) transmission. The frame may include a special subframe (SSF) for switching from downlink transmission to uplink transmission. A combination of the UL subframe, the DL subframe, and the special subframe included in one frame may be referred to as a UL/DL configuration. Another UL/DL configuration may indicate another combination of the UL subframe, the DL subframe, and the special subframe in one frame. For example, UL/DL configuration #2 may include six (6) DL subframes, two (2) UL subframes, and two (2) special subframes, and UL/DL configuration #5 may include eight (8) DL subframes, one (1) UL subframe, and one (1) special subframe. In some embodiments, in the wireless communication network (100), a long term evolution (LTE)-TDD communication system may be supported. In this case, the UL/DL configuration may be operated as shown in Table 1 presented below. In Table 1, D is a DL subframe, S is a special subframe, and U is a UL subframe.

TABLE 1

| UL/DL | Subframe number | | | | | | | | | | Number of subframes | | |
|---|---|---|---|---|---|---|---|---|---|---|---|---|---|
| configuration | 0 | 1 | 2 | 3 | 4 | 5 | 6 | 7 | 8 | 9 | DL | UL | S |
| 0 | D | S | U | U | U | D | S | U | U | U | 2 | 6 | 2 |
| 1 | D | S | U | U | D | D | S | U | U | D | 4 | 4 | 2 |
| 2 | D | S | U | D | D | D | S | U | D | D | 6 | 2 | 2 |
| 3 | D | S | U | U | U | D | D | D | D | D | 6 | 3 | 1 |
| 4 | D | S | U | U | D | D | D | D | D | D | 7 | 2 | 1 |
| 5 | D | S | U | D | D | D | D | D | D | D | 8 | 1 | 1 |
| 6 | D | S | U | U | U | D | S | U | U | D | 3 | 5 | 2 |

In order to avoid severe interference in uplink and downlink between cells, neighboring cells may have the same UL/DL configuration. It is assumed that the UL/DL configuration of the base station 110 is the same.

TABLE 2

| SSF | Symbol Number | | | | | | | | | | | | | |
|---|---|---|---|---|---|---|---|---|---|---|---|---|---|---|
| configuration | 0 | 1 | 2 | 3 | 4 | 5 | 6 | 7 | 8 | 9 | 10 | 11 | 12 | 13 |
| 0 | | Dw | | | | | | GP | | | | | | Up |
| 1 | | | | | Dw | | | | | | | GP | | Up |
| 2 | | | | | Dw | | | | | | | GP | | Up |
| 3 | | | | | | Dw | | | | | | | GP | Up |
| 4 | | | | | | Dw | | | | | | | GP | Up |
| 5 | | Dw | | | | | | GP | | | | | Up | |
| 6 | | | | | Dw | | | | | | GP | | Up | |
| 7 | | | | | Dw | | | | | | | GP | Up | |
| 8 | | | | | | Dw | | | | | | GP | Up | |
| 9 | | | Dw | | | | | | | GP | | | Up | |

Since the same carrier frequency is used for uplink transmission and downlink transmission in the TDD system, the base station 110 and the terminal 120 may require switching between uplink and downlink. A TDD frame may include a special subframe for the switching. The special subframe may include a downlink pilot time slot (DwPTS), a guard period (GP), and an uplink pilot time slot (UpPTS). The DwPTS is a period for downlink resources in the special subframe, and may be used to transmit a physical downlink shared channel (PDSCH). The UpPTS is a period for uplink resources in the special subframe, and may be used to transmit a sounding reference signal (SRS) or a physical random access channel (PRACH). The guard period (GP) is a period in which none of downlink transmission and uplink transmission occurs, and may be required for downlink-uplink switching. The guard period (GP) may be a period positioned between a DwPTS and a UpPTS in one special subframe (e.g., 1 ms). A combination of the DwPTS, the guard period and the UpPTS included in one special subframe may be referred to as a special subframe (SSF) configuration. Another SSF configuration may indicate another combination of a length of the DwPTS, a length of the guard period, and a length of the UpPTS in one subframe. For example, SSF configuration #5 indicates combination in which a DwPTS occupies three (3) symbols, a guard period occupies nine (9) symbols, and a UpPTS occupies two (2) symbols, and SSF configuration #7 indicates a combination in which a DwPTS occupies ten (10) symbols, a guard period occupies two (2) symbols, and a UpPTS occupies two (2) symbols. In some embodiments, when the wireless communication environment 100 supports an LTE-TDD communication system, the SSF configuration may be operated as shown in Table 2 presented below:

Meanwhile, a downlink signal transmitted through a neighboring cell may be introduced due to propagation delay after the DwPTS of another cell. Accordingly, the length of the guard period (GP) should be allocated not to cause interference between uplink transmission and downlink transmission in the base station 110. Specifically, as the length of the guard period is longer, the length of the DwPTS is shorter, or the length of the UpPTS is shorter, the period in which none of the downlink transmission and the uplink transmission occurs is elongated, and thus, it may be easy to avoid interference.

A communication node (e.g., a terminal, a base station 110, an entity of a core network) according to various embodiments of the disclosure may operate in an NR system. In addition, a communication node (e.g., a terminal, a base station 110, an entity of a core network) according to various embodiments may also operate in an LTE system.

In addition, in some embodiments, the base station 110 and the terminal may use a TDD communication system of NR. The TDD communication system of NR may be configured more flexibly than an LTE TDD communication system. The TDD communication system of NR may define a DL-UL pattern indicating a relationship regarding DL time resources for downlink communication and UL time resources for uplink communication. The DL-UL pattern may include a periodicity, a DL time period, and a UL time period. The periodicity may refer to a time during which one DL-UL pattern is applied. For example, the periodicity may be one of 0.5 ms, 0.625 ms, 1 ms, 1.25 ms, 2.5 ms, 3 ms, 4 ms, 5 ms, 10 ms. The DL time period may be a time resource by which downlink communication is sustained. The DL time period may be expressed by the number of slots, the number of slots and the number of symbols, or only the number of symbols. The DL time period may be positioned at a beginning part in one periodicity. The UL time period may be a time resource by which uplink is sustained. The UL time period may be expressed by the number of slots, the number of slots and the number of symbols, or only the number of symbols. The UL time period may be positioned at an end part in one periodicity. A slot other than a DL slot (a slot all of the symbols of which are DL symbols) and a UL slot (a slot all of the symbols of which are UL symbols) in one periodicity may be a flexible slot.

In an example of a resource structure of NR TDD, when a subcarrier spacing (SCS) is 15 kHz, five (5) slots may be defined during a periodicity of 5 ms. Two slots at the beginning part among the five (5) slots may be downlink slots, and two slots at the end part may be uplink slots, and the middle slot may have an uplink symbol and a downlink symbol coexisting. The first five (5) symbols among the fourteen (14) symbols of the other slot may be downlink symbols, the last three (3) symbols among the fourteen (14) symbols may be uplink symbols, and the remaining six (6) symbols among the fourteen (14) symbols may be flexible symbols.

Since the same carrier frequency is used for uplink transmission and downlink transmission in the TDD communication system, it is necessary to distinguish between a DL time period and a UL time period. Accordingly, as described above, the resource structures for the TDD communication system may include a DL time period and a UL time period, and a remaining period between the DL time period and the UL time period. Due to such time division, inter-cell interference may be caused by a propagation delay. For example, the base station 110 in an LTE communication system may transmit or receive signals according to frames. The base station 110 may transmit or receive signals according to frames.

Figure 2A:
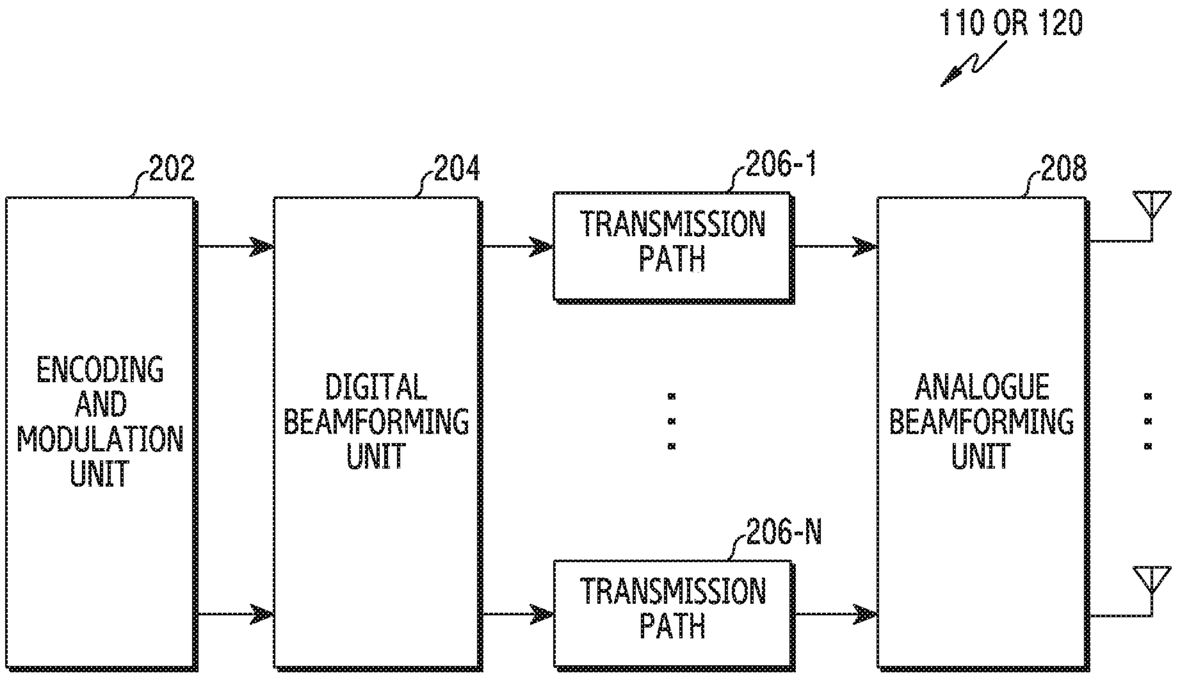
FIG. 2A illustrates a functional configuration of a communication unit of a base station device for signal amplification according to an embodiment of the disclosure.

FIG. 2A illustrates a functional configuration of a communication unit of a base station for signal amplification in a wireless communication system according to an embodiment of the disclosure.

Referring to FIG. 2A, a wireless communication unit or a communication unit may include an encoding and modulation unit 202, a digital beamforming unit 204, a plurality of transmission paths 206-1 to 206-N, and an analog beamforming unit 208.

The encoding and modulation unit 202 may perform channel encoding. For channel encoding, at least one of a low density parity check (LDPC) code, a convolution code, a polar code may be used. The encoding and modulation unit 202 may generate modulation symbols by performing constellation mapping.

The digital beamforming unit 204 may perform beamforming with respect to a digital signal (e.g., modulation symbols). To achieve this, the digital beamforming unit 204 may multiply modulation symbols by beamforming weights. The beamforming weights may be used to change a size and a phase of a signal, and may be referred to as a 'precoding matrix', a 'precoder'. The digital beamforming unit 204 may output digitally beamformed modulation symbols to the plurality of transmission paths 206-1 to 206-N. In this case, according to a multiple input multiple output (MIMO) transmission technique, modulation symbols may be multiplexed or the same modulation symbols may be provided to the plurality of transmission paths 206-1 to 206-N.

The plurality of transmission paths 206-1 to 206-N may convert digitally beamforming digital signals into analog signals. To achieve this, each of the plurality of transmission paths 206-1 to 206-N may include an inverse fast Fourier transform (IFFT) calculation unit, a cyclic prefix (CP) insertion unit, a DAC, an up-converter. The CP insertion unit may be for an orthogonal frequency division multiplexing (OFDM) scheme, and may be excluded when other physical layer schemes (e.g., filter bank multi-carrier (FBMC)) is applied. That is, the plurality of transmission paths 206-1 to 206-N may provide an independent signal processing process for a plurality of streams generated through digital beamforming. However, according to an implementation method, some of components of the plurality of transmission paths 206-1 to 206-N may be used in common.

The analog beamforming unit 208 may perform beamforming with respect to an analog signal. To achieve this, the digital beamforming unit 204 may multiply analog signals by beamforming weights. The beamforming weights may be used to change a size and a phase of a signal. Specifically, the analog beamforming unit 240 may be configured in various forms according to a connection structure between the plurality of transmission paths 206-1 to 206-N and antennas. For example, each of the plurality of transmission paths 206-1 to 206-N may be connected with one antenna array. In another example, the plurality of transmission paths 206-1 to 206-N may be connected with one antenna array. In still another example, the plurality of transmission paths 206-1 to 206-N may be adaptively connected with one antenna array or two or more antenna arrays.

Figure 2B:
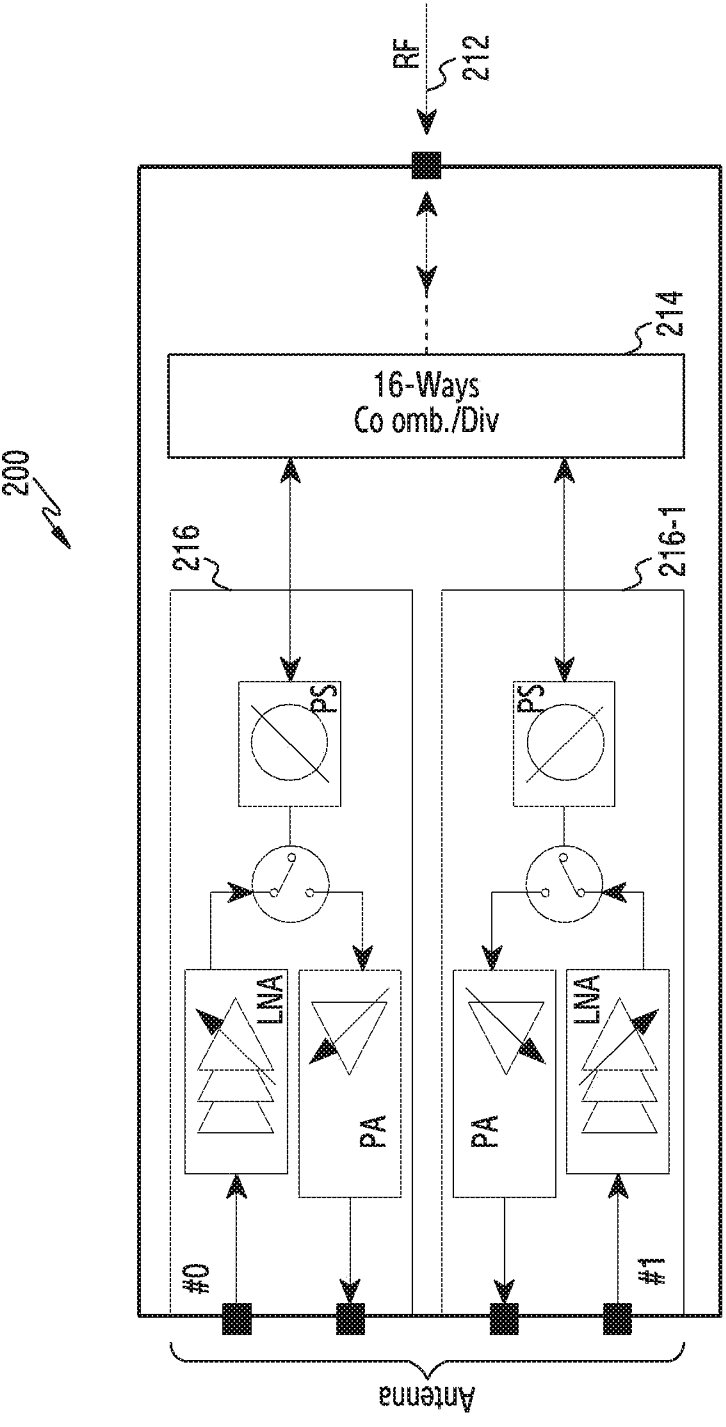
FIG. 2B illustrates an example of a radio frequency integrated circuit (RFIC) including a power amplifier according to an embodiment of the disclosure.

FIG. 2B illustrates an example of a radio frequency integrated circuit (RFIC) including a power amplifier according to an embodiment of the disclosure. mmWave phased array RFICs for efficient communication in mmWave bands in 5G communication are developing. To achieve high communication performance in mmWave bands, development of a high power, highly efficient, highly linear power amplifier (PA) in an IC (e.g., a complementary metal-oxide-semiconductor (CMOS)/silicon (Si)-based PA) may be required.

Referring to FIG. 2B, a RFIC 200 may include a plurality of RF chains 216, 216-1. An RF signal 212 inputted to the RFIC 200 may be distributed to each RF chain through a splitter (or a coupler) 214. According to an embodiment, the splitter 214 may be configured by a passive element or an active element.

Each of the plurality of RF chains 216, 216-1 may include a power amplifier. Since a transmission signal of a base station 110 or a terminal 120 in a wireless communication system is transmitted through a wireless channel, severe attenuation may occur. To solve this, a transmitter of the base station 110 or the terminal 120 may be configured to include an amplifier for amplifying a transmission signal. A power amplifier may be disposed in each of the plurality of RF chains to amplify a signal transmitted through air. The power amplifier may amplify an applied signal and may transmit the signal to an antenna. Although not shown in FIG. 2B, a signal passing through the power amplifier may be transmitted to an antenna (e.g., an antenna element of an array antenna) through a filter and a transmission path.

Referring to FIG. 2B, a structure of a RFIC which the disclosure is to propose through embodiments is illustrated. The RFIC structure illustrated in FIG. 2B is merely an embodiment for explaining a transmission process from an RF signal input to an antenna. That is, the embodiment of FIG. 2B is not interpreted as excluding a RFIC that includes a power amplifier as will be described below and has a different structure from FIG. 2B.

Referring to FIG. 2B, in the RFIC including the power amplifier, a path for receiving uplink and a path for transmitting downlink may be different. A path for receiving an uplink signal and a path for transmitting a downlink signal may share the same antenna.

Performance of the power amplifier may influence overall performance of the RFIC. To achieve high performance and high efficiency, the power amplifier according to embodiments of the disclosure may transmit a downlink signal applying compensation information. To solve nonlinearity of downlink signal transmission occurring in a time division duplex (TDD) system, compensation information may be applied to a pre-distorter. The compensation information may be applied based on a state of the power amplifier.

Figure 3:
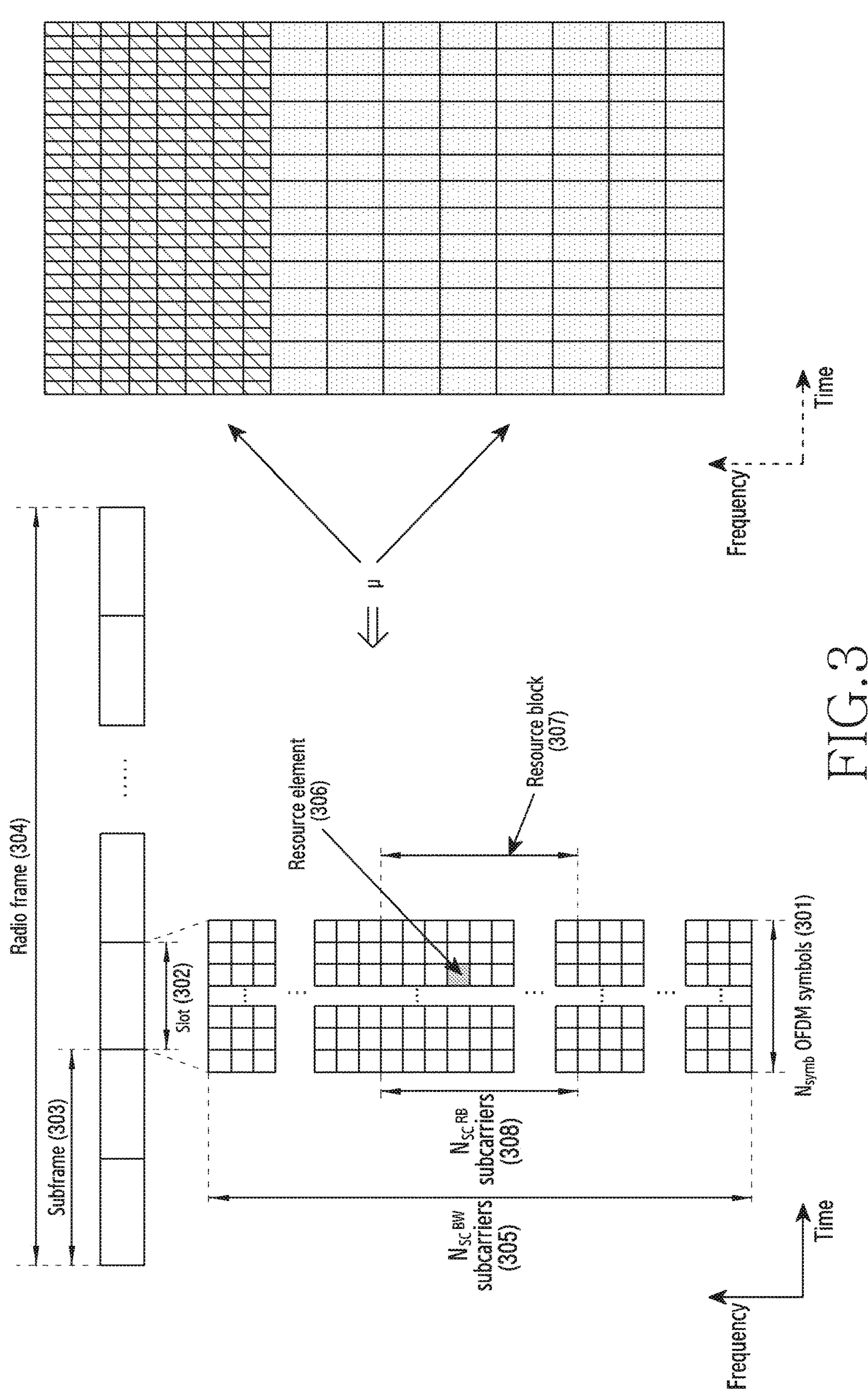
FIG. 3 illustrates an example of a radio resource area in a wireless communication system according to an embodiment of the disclosure.

FIG. 3 illustrates an example of a radio resource area in a wireless communication system according to an embodiment of the disclosure. In various embodiments of the disclosure, the radio resource area may include a structure of a time-frequency domain. According to an embodiment, a wireless communication system may include a NR communication system.

Referring to FIG. 3, the horizontal axis in the radio resource area indicates a time domain and the vertical axis indicates a frequency domain. A radio frame 304 may 10 ms long. The radio frame 304 may be a time domain period which is comprised of 10 subframes. A subframe 303 may be 1 ms long. A configuration unit in the time domain may be an orthogonal frequency division multiplexing (OFDM) and/or discrete Fourier transform (DFT)-spread-OFDM (DFT-s-OFDM) symbol, $N_{symb}$ OFDM and/or DFT-s-OFDM symbols 301 may cluster to constitute one slot 302. In various embodiments, an OFDM symbol may include a symbol related to a case in which signals are transmitted and received by using an OFDM multiplexing scheme, and a DFT-s-OFDM symbol may include a symbol related to a case in which signals are transmitted and received by using a DFT-s-OFDM or single carrier frequency division multiple access (SC-FDMA) multiplexing scheme. A minimum transmission unit in the frequency domain may be a subcarrier, and a carrier bandwidth constituting a resource grid may be comprised of $N_{SC}^{BW}$ subcarriers 305 in total. In addition, in the disclosure, embodiments related downlink signal transmission and reception are described for the convenience of explanation, but explanations are applicable to embodiments related to uplink signal transmission and reception.

In some embodiments, the number of slots 302 constituting one subframe 303, and the length of the slot 302 may vary according to a subcarrier spacing. The subcarrier spacing may be referred to as a numerology (p). That is, the subcarrier spacing, the number of slots included in the subframe, the length of the slot, the length of the subframe may be variously configured. For example, when a subcarrier spacing (SCS) is 15 kHz in an NR communication system, one slot 302 may constitute one subframe 303, and the slot 302 and the subframe 303 may be 1 ms long, respectively. In addition, for example, when the subcarrier spacing is 30 kHz, two slots may constitute one subframe 303. In this case, the slot may be 0.5 ms long and the subframe may be 1 ms long.

In some embodiments, the subcarrier spacing, the number of slots included in the subframe, the length of the slot, the length of the subframe may be variously applied according to a communication system. For example, in the case of a LTE system, a subcarrier spacing may be 15 kHz, and two slots may constitute one subframe. In this case, the slot may be 0.5 ms long and the subframe may be 1 ms long. In another example, in the case of an NR system, a subcarrier spacing (μ) may be one of 15 kHz, 30 kHz, 60 kHz, 120 kHz, 240 kHz, and the number of slots included in one subframe may be 1, 2, 4, 8, 16 according to a subcarrier spacing (μ).

A basic unit of a resource in the time-frequency domain may be a resource element (RE) 306, and the resource element 306 may be expressed by an OFDM symbol index and a subcarrier index. A resource block may include a plurality of resource elements. In a NR system, a resource block (RB) or a physical resource block (PRB) 307 may be defined as $N_{SC}^{RB}$ continuous subcarriers 308 in the frequency domain. The number of subcarriers $N_{SC}^{RB}$ may equal 12. The frequency domain may include common resource blocks (CRBs). A physical resource block (PRB) may be defined in a bandwidth part (BWP) on the frequency domain. CRB and PRB numbers may be differently determined according to a subcarrier spacing. In an LTE system, an RB may be defined by $N_{symb}$ continuous OFDM symbols in a time domain and $N_{SC}^{RB}$ continuous subcarriers in a frequency domain.

In a NR and/or LTE system, scheduling information on downlink data or uplink data may be transmitted from a base station 110 to a terminal 120 through downlink control information (DCI). In various embodiments, the DCI may be defined according to various formats, and each format may indicate whether the DCI includes scheduling information on uplink data (e.g., a UL grant) or includes scheduling information on downlink data (DL resource allocation), whether the DCI is compact DCI that includes control information of a small size, whether the DCI is fall-back DCI, whether spatial multiplexing using multiple antennas is applied, and/or whether the DCI is DCI for power control. For example, NR DCI format 1_0 or NR DCI format 1_1 includes scheduling regarding downlink data. In addition, for example, NR DCI format 0_0 or NR DCI format 0_1 may include scheduling regarding uplink data.

As described above, FIG. 3 illustrates an example of a downlink and uplink slot structure in a wireless communication system. In particular, FIG. 3 illustrates a structure of a resource grid of a 3GPP NR system. Referring to FIG. 3, a slot may include a plurality of orthogonal frequency division multiplexing (OFDM) symbols in the time domain, and may include a plurality of resource blocks (RBs) in the frequency domain. A signal may be configured by a part or entirety of the resource grid. In addition, typically, the number of OFDM symbols included in one slot may vary according to a length of a cyclic prefix (CP). Although FIG. 3 illustrates that one slot is comprised of 14 OFDM symbols for the convenience of explanation, a configuration of a symbol is not specified for a signal indicated in the disclosure. In addition, a modulation scheme of a generated signal is not limited to quadrature amplitude modulation (QAM) of a specific value, and may follow modulation schemes of various communication standards such as binary phase-shift keying (BPSK), quadrature phase shift keying (QPSK).

Various embodiments of the disclosure are described based on an LTE communication system or an NR communication system, but the contents of the disclosure are not limited thereto and may be applied to various wireless communication systems for transmitting uplink control information. In addition, the contents of the disclosure may be applied to a non-licensed band in addition to a licensed band if necessary.

The disclosure may relate to a signal transmission method for transmitting higher layer signaling or higher signal from a base station 110 to a terminal 120 by using a downlink data channel of a physical layer, or from the terminal 120 to the base station 110 by using an uplink data channel of a physical layer. According to an embodiment, higher layer signaling may include at least one of radio resource control (RRC) signaling, or signaling according to a F1 interface between a centralized unit (CU) and a distributed unit (DU), or a signal transmission method for transmitting a signal through a media access control (MAC) control element (MAC CE). In addition, according to an embodiment, the higher layer signaling or higher signal may include system information which is transmitted to a plurality of terminals 20 in common, for example, a system information block (SIB).

Figure 4:
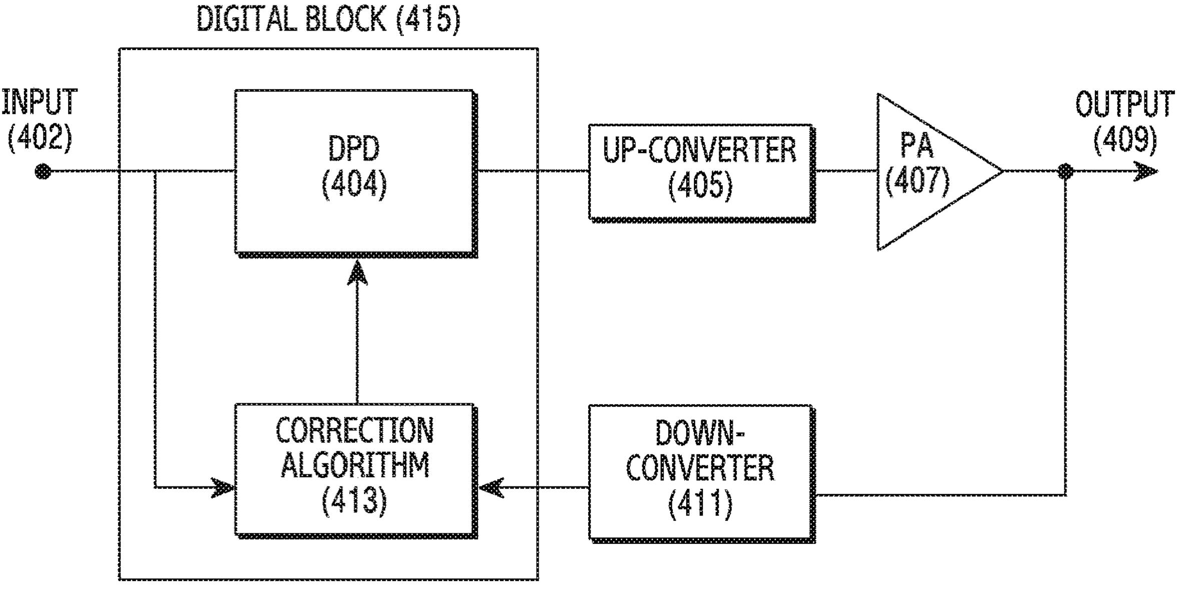
FIG. 4 illustrates a functional configuration of a base station device including a digital pre-distorter according to an embodiment of the disclosure.

FIG. 4 illustrates a functional configuration of a base station including a digital pre-distorter (DPD) according to an embodiment of the disclosure.

Referring to FIG. 4, a base station 110 may include a DPD 404, a frequency up-converter 405, a power amplifier 407 and a frequency down-converter 411, a correction algorithm unit 413. The base station 110 may include a digital block 415 including the DPD 404 and the correction algorithm unit 413. An operating process of the DPD of obtaining an input signal 402, and an operating process of the correction algorithm unit 413 performed by obtaining an output signal 409 from the frequency down-converter 411 may be performed in the digital block 415. The digital block may perform operations under a digital mode like the input signal 402, which is different from the output signal 409 which is an analog signal. The input signal 402, which is a downlink signal, may include at least one of a physical downlink control channel (PDCCH), a physical downlink shared channel (PDSCH), a demodulation reference signal (DMRS), a channel state information-reference signal (CSI-RS).

Since a wireless communication system which provides high-speed wireless Internet should process signals of several MHz (megahertz) to tens of MHz bandwidths, a linear amplification technology of a broadband signal is more required. A technique for removing nonlinearity of an active element used in a power amplifier may include pre-distortion. A pre-distortion method using the DPD 404 may have more excellent linearity improvement performance compared an analog pre-distortion method since a signal generated through a distortion removal loop is a digital signal of a baseband. As shown in FIG. 4, the DPD 404 may compare an input signal and an output signal to linearize a signal to be transmitted to the power amplifier. The DPD 404 may perform signal processing to minimize a distortion component of the output signal and to linearly amplify an input modulation signal and to output the signal. Specifically, in a wireless communication system of a time division duplex (TDD) method, an input signal which is a downlink signal may undergo digital baseband processing and then may be pre-distorted in the DPD 404. The pre-distorted downlink signal may be transmitted to the power amplifier through the frequency up-converter 405 as a radio frequency (RF) signal. The pre-distorted RF band signal may offset nonlinearity characteristics of the power amplifier and may be outputted as an output signal having a linearity gain. In addition, the DPD 404 may extract a distortion component of the output signal passing through the power amplifier, and may execute the correction algorithm unit 413. Although not shown, an additional circuit may be configured in the digital pre-distortion method to adaptively control based on an error of a signal. The additional circuit may include a digital signal processor (DSP) for controlling digital pre-distortion, and a look-up table (LUT) for pre-calculating a digital distortion signal value and loading the same.

Referring to FIG. 4, the DPD 404 may pre-distort a signal to be inputted to the power amplifier in order to remove nonlinearity of a signal outputted from the power amplifier. The DPD 404 should know nonlinearity output characteristics at the power amplifier in order to pre-distort an inputted signal with nonlinearity inverse characteristics. Accordingly, the DPD 404 should identify characteristics of the power amplifier (e.g., characteristics of the output signal 409). The input signal may be inputted to the DPD 404 as a digital signal. Signal correction may be performed on the input signal inputted to the DPD 404 by the correction algorithm unit 413 in the DPD 404. The input signal for which the correction algorithm is performed may be converted into a RF signal through the up-converter 405 as a pre-distorted signal, and may be transmitted to the power amplifier. The nonlinearity inverse characteristics of the input signal transmitted to the power amplifier may be offset by distortion characteristics of the power amplifier and may be transmitted as an output signal.

A configuration of the DPD 404 and a signal distortion method may be as described above. However, in a TDD system, in spite of signal linearization of the DPD 404, distortion characteristics may occur in a predetermined period of a downlink signal period due to deterioration of the power amplifier. Hereinafter, distortion characteristics caused by deterioration of a power amplifier will be described in detail.

Figure 5A:
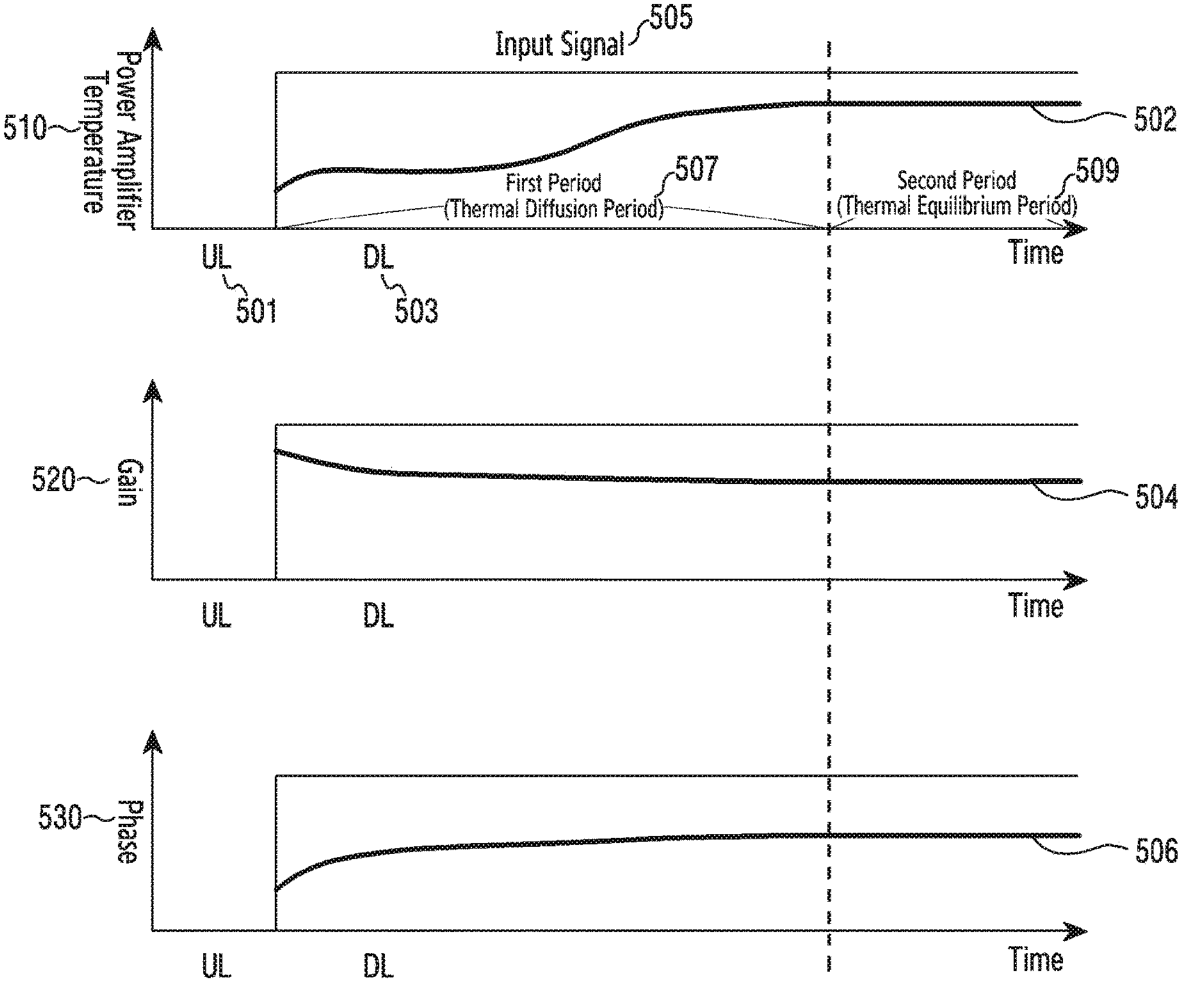
FIGS. 5A and 5B illustrate examples of downlink transmission period states when a compensator is not included according to various embodiments of the disclosure.
Figure 5B:
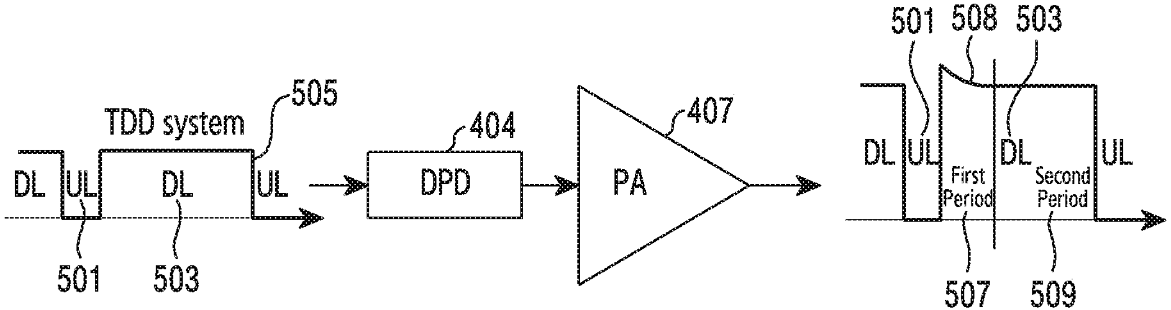

FIGS. 5A and 5B illustrate examples of downlink transmission period states when a compensator is not included according to various embodiments of the disclosure.

Referring to FIG. 5A, examples of downlink transmission period states related to a power amplifier including the DPD 404 shown in FIG. 4 and signal characteristics by the power amplifier are illustrated. A reference of the time axis of the downlink transmission period illustrated in FIG. 5A may be understood as a plurality of symbols or slots under a TDD system. A downlink input signal 505 inputted to the power amplifier may be a pre-distorted signal resulting from performance of the correction algorithm of the DPD 404 as described in FIG. 4. Referring to FIG. 5A, characteristic states according to the input signal inputted to the power amplifier may not change along the time axis. However, these states are ideal states according to the input signal and characteristic states may be changed due to deterioration characteristics of the power amplifier.

Referring to the graph showing a temperature 510 of the power amplifier (e.g., a transistor (TR) junction unit), in the TDD system, the input signal may be transmitted to the power amplifier in a downlink transmission period 503. An uplink transmission 501 may also be transmitted. In this case, the temperature of a power amplifier element 502 may be changed. Specifically, in a period in which the downlink period starts, thermal diffusion may occur from a printed circuit board (PCB) in the power amplifier to a case of a radio unit (RU). The temperature of a junction unit of a power amplifier transistor may be changed due to the thermal diffusion. The thermal diffusion may cause a temperature change from a start time to a predetermined time in the transmission period of a downlink signal. A period from the start time of the transmission period of the downlink signal to the predetermined time may be referred to as a first period (e.g., a thermal diffusion period) 507.

The temperature change of the power amplifier element may cause nonlinearity distortion characteristics. After a predetermined time is elapsed, the temperature of the power amplifier may reach a thermal equilibrium state. The thermal equilibrium state refers to a state in which a heat flow does not exist when two or more physical systems are connected to a heat transmission path. Since there is no heat flow in both systems, there is no change in the temperature. When the temperature in a system is spatially and temporally constant, that is, in the thermal equilibrium state, transmission of energy is not allowed and thus the system may be determined to be stable. When a power amplifier of a wireless communication system is in a thermal equilibrium state, it may be determined that an element is stable. A period starting from a time at which a thermal equilibrium state is reached may be referred to as a second period (e.g., a thermal equilibrium period) 509.

Referring to the graphs showing a gain 520 and a phase 530 of a downlink input signal, like the temperature change of the power amplifier, a gain 504 and a phase 506 of an input signal may be changed in the first period 507. Specifically, the gain of the input signal in the first period 507 may be reduced to be less than or equal to a desired value due to deterioration of the power amplifier. In addition, the phase of the input signal in the first period 507 may increase to be greater than or equal to a desired value due to deterioration of the power amplifier. States of the gain and phase characteristics reach thermal equilibrium in the second period 509, and may not change, namely, may be stabilized. However, as described above, deterioration characteristics of the power amplifier may occur in the first period of the downlink signal period, that is, in the first period 507, under the TDD system, and this may cause deterioration of a linear error vector magnitude (EVM) of an output signal.

The EVM is a measurement value that is used for comparing quality of a transmission signal in a wireless communication system. The EVM may be a modulation quality criterion of a modulated signal in a predetermined spectrum band in a digital communication method. The EVM is one of indexes indicating reception performance of digital signals, and may show how far a digital signal is away from an original signal vector. A relationship between an EVM value and a SNR value which is one of other communication quality indexes may be defined as follows:

$$EVM = \sqrt{\frac{1}{SNR}} \quad \text{Equation 1}$$

In Equation 1, the EVM is an error vector magnitude and the SNR is a signal-to-noise ratio.

Carrier leakage, phase noise, noise of communication signals may indicate a high EVM measurement value. A high EVM measurement value may indicate quality degradation of communication. As described above, when the power amplifier element is in the thermal equilibrium state, a lower EVM measurement value may be obtained.

On the other hand, when the power amplifier element is not in the thermal equilibrium state, that is, when there is a change in the temperature of the element, the system of the element may be determined to be unstable. The unstable system of the element may cause nonlinearity distortion characteristics of signals. The nonlinearity distortion characteristics of signals may cause quality degradation of signals, such as a noise. In addition, the quality degradation of signals may result in a high EVM value. In order to solve an error vector magnitude of a signal and guarantee high communication quality, distortion characteristics of a power amplifier should be prevented in transmitting signals.

Referring to FIG. 5B, the downlink transmission period 503 of the downlink input signal 505 may be a period in which the downlink signal is transmitted to the power amplifier 407 through the DPD 404. When the input signal is inputted to the power amplifier 407, deterioration may occur and thus distortion characteristics may occur in a downlink transmission period of an output signal. As described above, before the power amplifier reaches the thermal equilibrium state period 509, the downlink signal may have unstable distortion characteristics 508 in a predetermined period 507 of the downlink transmission period. The distortion characteristics 508 may cause nonlinearity of the signal and a high EVM value.

To solve the above-described problem, embodiments of the disclosure propose a method for solving distortion characteristics occurring during a first predetermined period in a downlink transmission period under a TDD system, in addition to removal of nonlinearity by the DPD 404, when a power amplifier transmits signals. To achieve this, embodiments of the disclosure propose a method of identifying compensation information based on a state change of a power amplifier according to time. Embodiments of the disclosure propose a method of applying identified compensation information to a compensator. When a signal to which compensation information is applied by the compensator is used, not only nonlinearity but also non-distortion characteristics of a signal by the power amplifier may be improved. Hereinafter, a method for identifying compensation information according to a state of a power amplifier element, and applying the same will be described in detail.

Hereinafter, a related-art power amplifier and a problem between thermal equilibrium times, and characteristics to be enhanced through embodiments of the disclosure will be described with reference to FIGS. 6A, 6B, and 7 to 10.

Figure 6A:
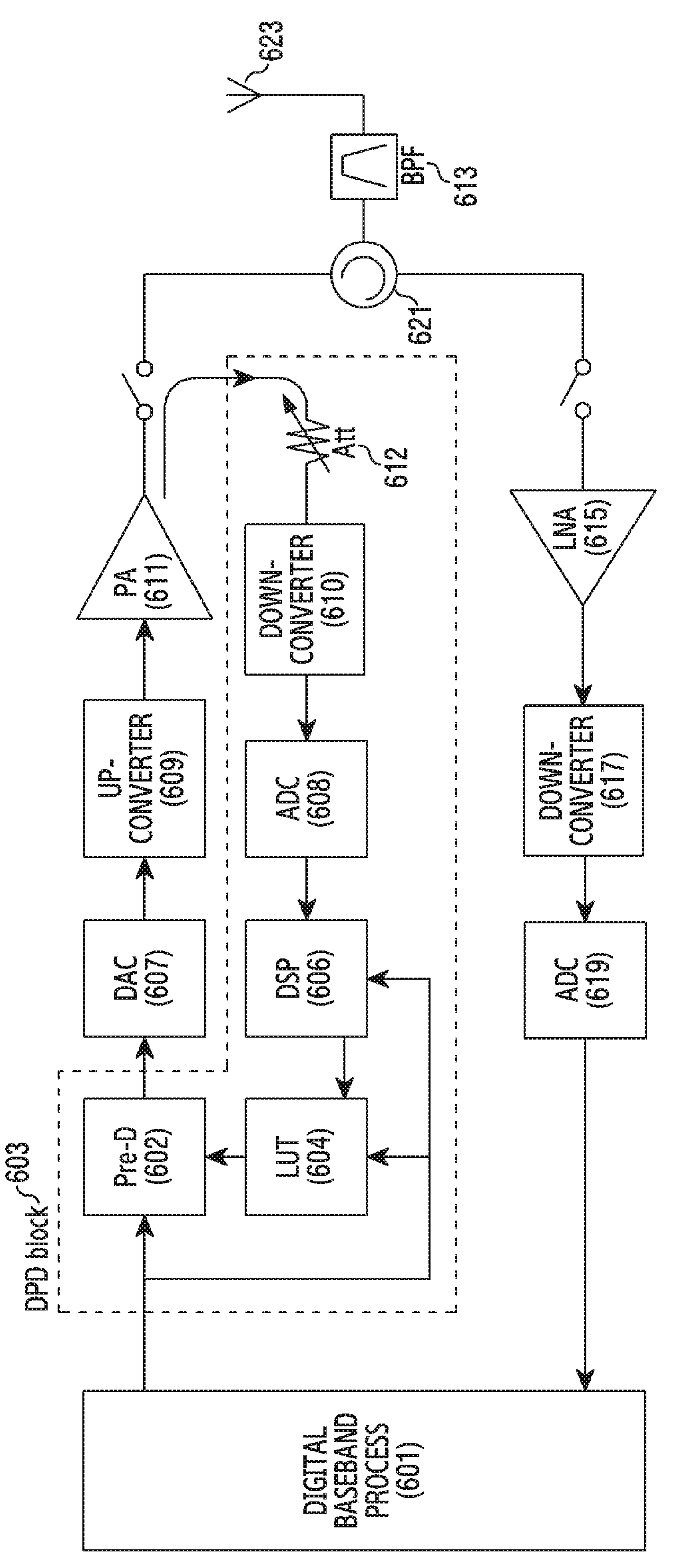
FIG. 6A illustrates a functional configuration of a base station device including a detailed configuration of a digital pre-distorter according to an embodiment of the disclosure.

FIG. 6A illustrates a functional configuration of a base station including a detailed configuration of a digital pre-distorter according to an embodiment of the disclosure.

Referring to FIG. 6A, an input signal undergoing a digital baseband process 601 may be inputted to a DPD 602. The input signal may be a downlink signal, and may include at least one of a physical downlink control channel (PDCCH), a physical downlink shared channel (PDSCH), a demodulation reference signal (DMRS), a channel state information-reference signal (CSI-RS). The input signal inputted to the DPD 602 may be pre-distorted according to inverse characteristics of distortion characteristics of a power amplifier, based on a DSP 606 for controlling digital pre-distortion and a look-up table (LUT) 604 for pre-calculating a digital signal value and loading the same. A DPD block 603 of FIG. 6A may include the DPD 602, the LUT 604, the DSP 606, an analog-to-digital converter (ADC) 608, a frequency down-converter 610, and an attenuator 612. However, the DPD block 603, which will be described below, is not limited thereto, and may be referred to as a processor of digital signals including the DPD 602, the LUT 604, and the DSP 606 as a digital DPD block.

The input signal inputted to the DPD 602 may be modulated into an analog signal through a digital to analog converter (DAC) 607. The input signal modulated into the analog signal may be modulated through the frequency up-converter 609, and may be inputted to a power amplifier 611. The input signal inputted to the power amplifier may be amplified and may be outputted and transmitted to an antenna 623 through an isolator 621 and a bandpass filter (BPF) 613 according to TDD synchronization. Additionally, a received input signal through the antenna 623 may be passed through a low noise amplifier (LNA) 615, an another down-converter 617 and another ADC 619, to the digital baseband process.

Figure 6B:
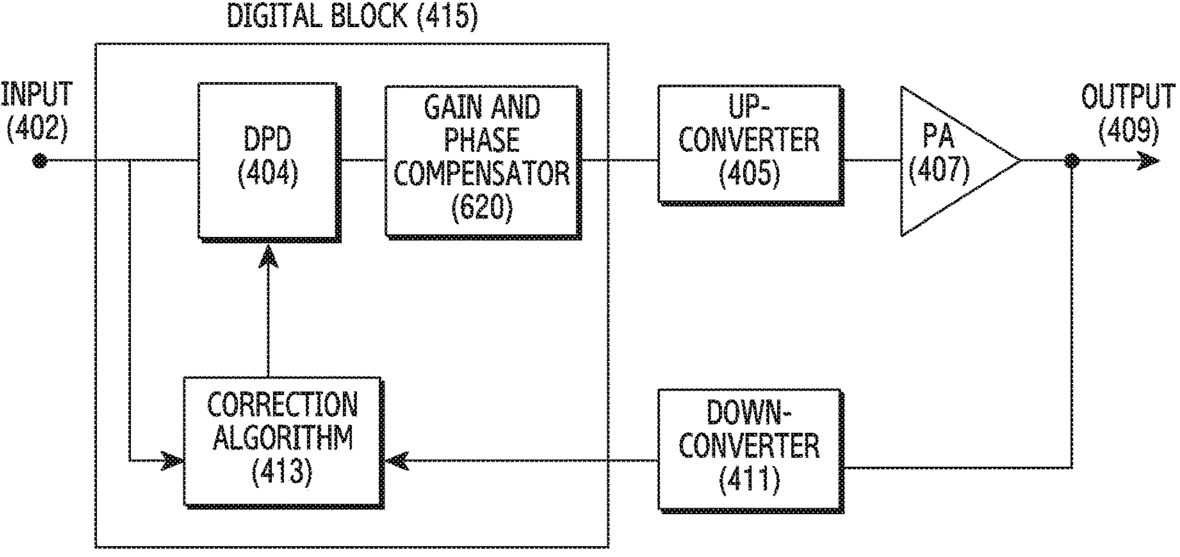
FIG. 6B illustrates a functional configuration of a base station device including a digital pre-distorter and a compensator according to an embodiment of the disclosure.

In this case, a distortion removal loop may be configured to generate a digital pre-distortion signal. An output signal outputted from the power amplifier may be demodulated into a digital signal through the attenuator 612, a frequency down-converter 610, and the ADC 608. Based on the output signal which is demodulated into the digital signal, the DSP 606 and the LUT 604 may perform a correction algorithm to identify distortion characteristics of the downlink signal and to apply inverse characteristics based on the distortion characteristics to the DPD 602, thereby improving linearity. However, during the linearity improvement process of the downlink signal described above, more distortion characteristics may occur in a predetermined period of a downlink transmission period due to deterioration of the power amplifier. A method for solving this through a compensator 620 will be described hereinbelow FIG. 6B illustrates a functional configuration of a base station including a digital pre-distorter and a compensator according to an embodiment of the disclosure. According to embodiments of the disclosure, there is provided a method for improving output signal quality of a base station transmission system by minimizing performance deterioration of a digital pre-distortion system according to a change in characteristics of a power amplifier in a TDD system. Specifically, in a TDD system, performance of a DPD 404 may be improved by compensating for a change in characteristics of a power amplifier through the gain and phase compensator 620. The compensator 620 may improve output signal quality of a base station transmission system, thereby improving a spurious component of an adjacent band and minimizing magnetic signal distortion.

Referring to FIG. 6B, the base station 110 device may further include the phase compensator 620. The gain and phase compensator 620 may further be included in the base station 110 device in addition to the DPD 404. In the disclosure, the compensator 620 may refer to a compensator 620 for compensating for a gain and a phase, but embodiments of the disclosure are not limited thereto. According to an embodiment, the compensator 620 may be configured to compensate for a gain. According to another embodiment, the compensator 620 may be configured to compensate for a phase.

According to an embodiment, the DPD 404 and the compensator 620 may be included in a digital block 415 which is a unit for processing a digital signal. In FIG. 6B, it is illustrated that the compensator 620 is implemented within the digital block 415, but this is merely one of implementation methods and the compensator 620 may be implemented separately from the digital block 415.

The compensator 620 may apply compensation information identified based on an output signal outputted from the power amplifier to a signal outputted from the DPD 404. The compensation information that the compensator 620 applies may be adaptively adjusted based on a state of the power amplifier. The compensation information is not limited thereto and may be pre-configured. The compensation information may be identified based on gain and phase information of the output signal. The compensation information is not limited thereto and may be identified based on at least one of a gain or a phase. The disclosure relates to the compensator 620 which removes distortion characteristics caused by thermal deterioration of the power amplifier under a TDD system, and compensation information that the compensator 620 applies may be identified with reference to a time unit (e.g., a symbol, a slot, etc.) according to a TDD system.

A signal to which compensation information is applied by the compensator 620 may be modulated into an analog signal and may be inputted to the power amplifier 407. In this case, even if a signal of a predetermined period of a downlink signal transmission period is distorted due to deterioration of the power amplifier, the distortion may be offset by a signal adjusted by the compensation information. Through the signal with the distortion characteristics being offset, the linearity of the DPD 404 may be improved and a low EVM value may be obtained, and accordingly, improved signal quality may be obtained.

Figure 7:
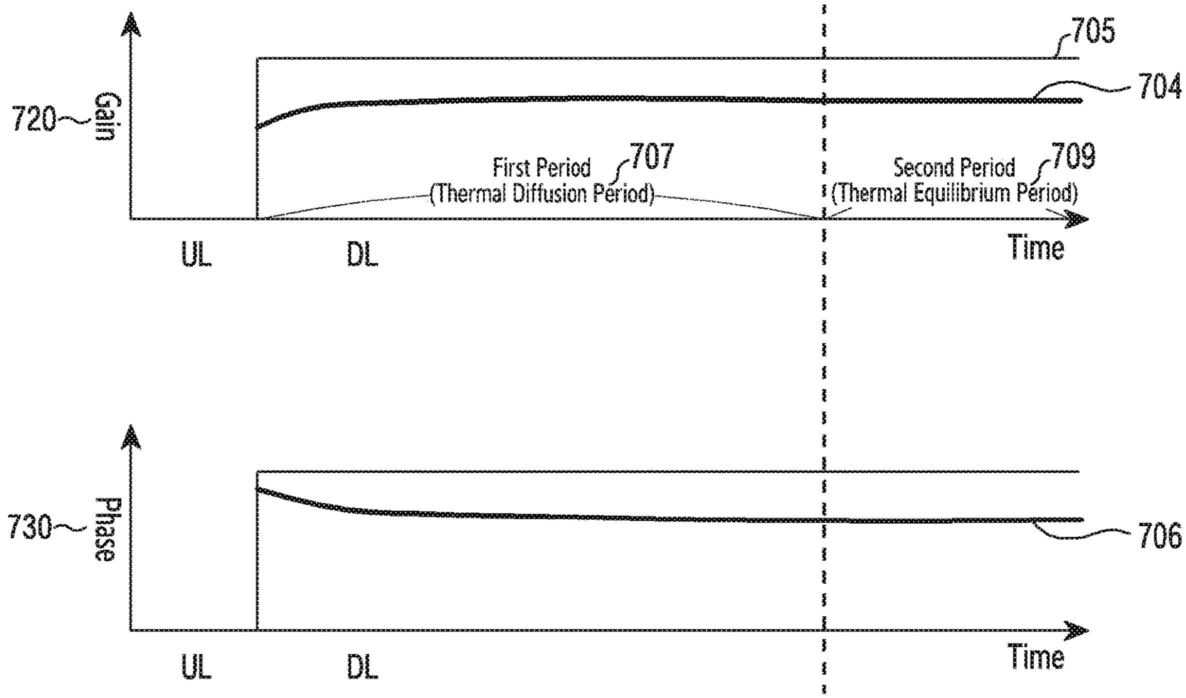
FIG. 7 illustrates an example of a compensation characteristic state of a compensator according to a time period based on compensation information related to a gain and a phase according to an embodiment of the disclosure.

FIG. 7 illustrates examples of compensation characteristic states of a compensator according to a time period based on compensation information on a gain and a phase according to an embodiment of the disclosure.

Referring to FIG. 7, a downlink input signal 705 inputted to the amplifier may be a pre-distorted signal resulting from performance of the correction algorithm of the DPD 404 as shown in FIG. 4. As shown in FIG. 7, characteristic states according to the input signal inputted to the power amplifier may not change along the time axis. However, these states may be ideal states according to an input signal, and characteristic states may be changed due to deterioration characteristics of the real power amplifier.

Referring to FIG. 7, as described above, in a graph 720 illustrating gain, a first period 707 may be a thermal diffusion period and may be a period in which the temperature of the power amplifier 704 increases as a signal is inputted. The first period 707 may be a period in which the gain of the input signal is reduced. In addition, the first period 707 may be a period in which the phase of the input signal increases. The first period 707 in which the gain and the phase are distorted due to thermal diffusion may have a length of one or more symbols starting from a time at which downlink transmission starts under the TDD system. After a predetermined time is elapsed, a second period 709 in which the temperature of the power amplifier reaches a thermal equilibrium state and is stabilized may start. The second period 709 may be a period in which the temperature of the power amplifier, the gain of the input signal and the phase of the input signal do not change. The second period 709 may start after the length of one or more symbols passes after the time at which the downlink transmission starts under the TDD system.

Referring to FIG. 7, according to an embodiment, in a graph 730 of a phase, the compensator 620 may have inverse characteristics to a gain change or phase change of the power amplifier with reference to the time axis. For example, the compensator 620 may increase the gain or may reduce the phase in the first period (e.g., a thermal diffusion period) 707. According to an embodiment, the compensation information may have a gain characteristic 706 of increasing along the time axis. According to an embodiment, the compensation information may have a phase characteristic (i.e., gain characteristic 706) of reducing along the time axis. Accordingly, linearization performance of the DPD 404 may be improved by compensating for characteristics of at least one of the gain or phase of the power amplifier, caused by performance deterioration under the TDD system.

Referring to FIG. 7, a compensation value of a gain or a phase applied to the compensator 620 according to the first period 707 may be identified based on a characteristic value of a gain or a phase distorted due to deterioration of the power amplifier. Specifically, a compensation value applied to the compensator 620 may be identified by compensation information which is identified based on a characteristic value distorted due to deterioration of the power amplifier. The compensation information including the identified compensation value may be applied to a signal that is subsequently outputted from the DPD 404. The output signal to which the compensation information is applied may be transmitted to the power amplifier, and may offset distortion characteristics caused by deterioration of the power amplifier, so that a signal of desired quality may be outputted. According to various embodiments of the disclosure, once compensation information is identified, the compensation information may be applied to the compensator 620 and may be applied as a defined constant value. However, according to an embodiment, this should not be considered as limiting, and, when a signal is inputted, compensation information may be adaptively refined based on at least one of a state of the power amplifier, a change of the temperature, a change of the gain, or a change of the phase. The compensation information may be identified based on at least one of a change amount of the gain, a change amount of the phase, a duration in which a second period (e.g., a thermal equilibrium period) 709 is reached, or a state of the power amplifier (e.g., a temperature or thermal expansion efficient of the power amplifier). According to an embodiment, the compensation information may be identified in relation to time according to the first period 707 under the TDD system. According to an embodiment, a time at which it is determined that a change of at least one of the temperature, gain, or a phase of the power amplifier is less than or equal to a specific threshold value may be identified as an end time of the first period 707 (that is, a start time of the second period 709), and the compensation information may be identified in relation to the first period 707. This is because a period required for solving distortion characteristics of a signal is a distortion period of the first period 707 and thus identification of compensation information related to the second period 709 is unnecessary waste.

As described above, the compensator 620 may apply a compensation value to a downlink signal outputted from the DPD 404 by using compensation information based on distortion characteristics of the power amplifier.

Figure 8:
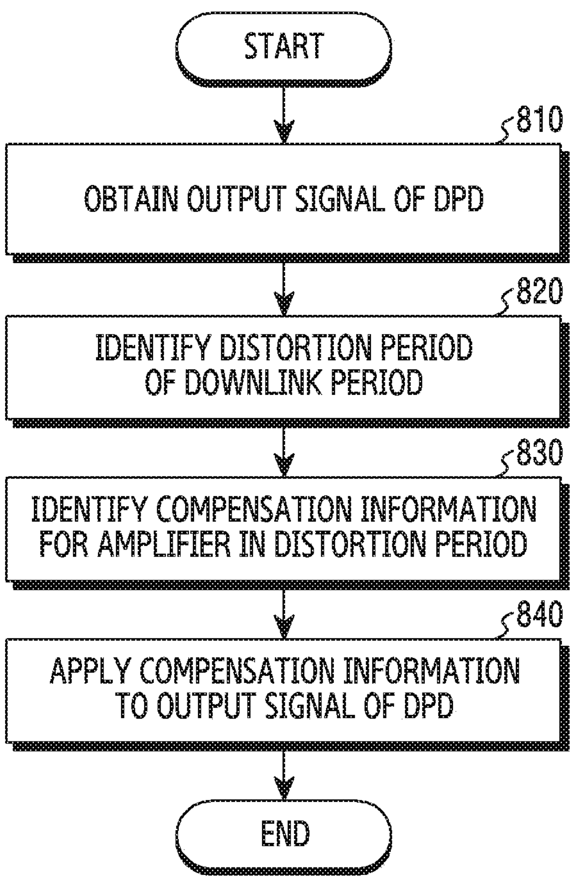
FIG. 8 illustrates an operation flow of a base station device to apply compensation information to a digital pre-distorter according to an embodiment of the disclosure.

FIG. 8 illustrates an operation flow of a base station to apply compensation information to a digital pre-distorter according to an embodiment of the disclosure.

Referring to FIG. 8, at operation 810, the base station 110 may acquire an output signal of the DPD 404. Under a TDD system, the output signal of the DPD 404 may be a downlink signal, and may include at least one of a physical downlink control channel (PDCCH), a physical downlink shared channel (PDSCH), a demodulation reference signal (DMRS), a channel state information-reference signal (CSI-RS). According to an embodiment, the output signal of the DPD 404 may be a signal that is pre-distorted according to inverse characteristics of distortion characteristics of the power amplifier, based on the digital signal processor 606 for controlling digital pre-distortion, and the look-up table (LUT) 604 for pre-calculating a digital distortion signal value and loading the same. According to an embodiment, the output signal of the DPD 404 may be an analog signal that is modulated by the DAC and the frequency up-converter 405. According to an embodiment, the output signal of the DPD 404 may be expressed to have a continuous value (e.g., a temperature value of the power amplifier, a gain or a phase of a signal) on a symbol or slot basis with reference to the time axis under the TDD system.

At operation 820, the base station 110 may identify a distortion period of a downlink period. The distortion period may be a distortion period that shows distorted characteristics starting from the downlink period after an uplink period is ended in a TDD configuration. In FIG. 8, the uplink period or the downlink period refer to a period according to a time division duplex (TDD) configuration. The temperature of the power amplifier may increase in the first period (e.g., a thermal diffusion period) 707 before the power amplifier reaches a thermal equilibrium state. A gain value of a signal may be reduced in the first period 707. A phase value of a signal may increase in the first period 707. According to an embodiment, the first period 707 in which at least one of the temperature of the power amplifier, the gain or phase of the signal is changed may be identified as a distortion period. After a predetermined time is elapsed, when the second period (e.g., a thermal equilibrium period) 709 in which the temperature of the power amplifier does not increase anymore is identified, a start time of the second period 709 may be identified as an end time of the distortion period. The distortion period may be identified based on a state of the power amplifier (e.g., a temperature or thermal expansion coefficient of the power amplifier) or a duration in which the power amplifier reaches a thermal equilibrium state. The distortion period is a period in which compensation information should be applied to the compensator 620, and identifying a period in which solving of distortion characteristics of the power amplifier is not required as a distortion period may cause unnecessary waste. According to an embodiment, the distortion period may have a length of at least one symbol, but is not limited thereto. According to an embodiment, the distortion period may be a period that has a characteristic (e.g., temperature of the power amplifier, a gain or a phase of a signal) value changing with time with reference to the time axis of the TDD system.

At operation 830, the base station 110 may identify compensation information for the power amplifier in the distortion period. The compensation information refers to compensation information for attenuating distortion characteristics of the power amplifier occurring in the distortion period. As described above, a compensation value of a gain or a phase applied to the compensator 620 in the distortion period may be identified by compensation information which is identified based on a characteristic value distorted by deterioration of the power amplifier. According to an embodiment, the compensation information may be identified based on at least one of a change amount of the gain, a change amount of the phase, a duration in which the second period (e.g., a thermal equilibrium period) 709 is reached, or a state of the power amplifier (e.g., a temperature or thermal expansion efficient of the power amplifier). According to an embodiment, the compensation information may be identified in relation to a unit time according to the distortion period under the TDD system.

At operation 840, the base station 110 may apply the identified compensation information to the output signal of the DPD 404. In other words, the compensator 620 may apply a compensation value to a downlink signal outputted from the DPD 404 by using the compensation information which is based on distortion characteristics of the power amplifier. According to various embodiments of the disclosure, once compensation information is identified, the compensation information may be applied to the compensator 620 and may be applied to a following downlink signal as a defined constant value. However, this should not be considered as limiting. When continuous signals are inputted, the compensation information may be adaptively refined based on at least one of a state of the power amplifier, a change of a temperature, a change of a signal gain or a change of a signal phase.

Figure 9:
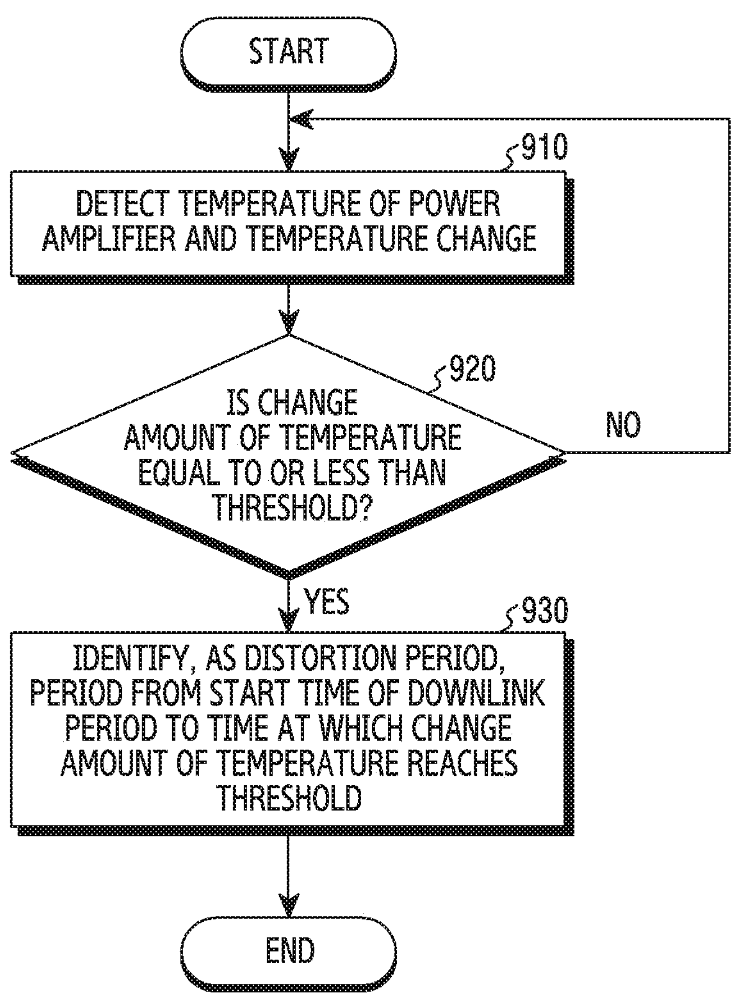
FIG. 9 illustrates an operation flow of a base station device for identifying a distortion period of a downlink period according to an embodiment of the disclosure.

FIG. 9 illustrates an operation flow of a base station for identifying a distortion period of a downlink period according to an embodiment of the disclosure.

Referring to FIG. 9, a period in which at least one of a temperature of the power amplifier, a gain or a phase of a signal is changed may be identified as a distortion period. After a predetermined time is elapsed, when a second period (e.g., a thermal equilibrium period) 709 in which the temperature of the power amplifier does not increase anymore is identified, a start time of the second period may be identified as an end time of the distortion period. The distortion period may be identified based on a state of the power amplifier (e.g., a temperature or thermal expansion coefficient of the power amplifier) or a duration in which the power amplifier reaches a thermal equilibrium state. The distortion period is a period in which compensation information should be applied to the compensator 620, and identifying a period in which solving of distortion characteristics of the power amplifier is not required as a distortion period may cause unnecessary waste. According to an embodiment, the distortion period may have a length of at least one symbol, but is not limited thereto. According to an embodiment, the distortion period may be a period that has a characteristic (e.g., temperature of the power amplifier, a gain or a phase of a signal) value changing with time with reference to the time axis of the TDD system.

Referring to FIG. 9, at operation 910, the base station 110 may detect a temperature of the power amplifier or a temperature change. According to an embodiment, the temperature change of the power amplifier may refer to a change in a value according to a time unit under the TDD system. In FIG. 9, detecting a temperature and a temperature change is disclosed, but the disclosure is not limited thereto, and a distortion period may be identified by detecting a gain of a signal and a change in the gain, or a phase of a signal or a change in the phase.

At operation 920, the base station 110 may compare a change amount of the temperature of the power amplifier and a threshold value, and may identify whether the change amount of the temperature is less than or equal to the threshold value. According to an embodiment, when there exists a change amount of the temperature according to distortion characteristics of the power amplifier at a downlink transmission start time, the base station 110 may identify the downlink transmission start time as a start time of detecting the temperature and the temperature change. For example, when the change amount of the temperature of the power amplifier at the downlink transmission start time is greater than or equal to a predetermined value, the base station 110 may identify the downlink transmission start time as a start time of detecting the temperature change. According to an embodiment, the threshold value may be a specific value which is pre-defined. However, this should not be considered as limiting. According to another embodiment, the threshold value may be adaptively defined according to a state of the power amplifier, distortion characteristics of a signal or an external factor. According to an embodiment, the threshold value may be a temperature change amount when the power amplifier reaches a thermal equilibrium state.

The base station 110 should identify a period in which the power amplifier is in a thermal diffusion state in order to identify a distortion period. That is, the distortion period may refer to a period from the downlink transmission start time to a time at which the power amplifier reaches a thermal equilibrium state. To determine whether the power amplifier reaches a thermal equilibrium state, a temperature change amount of the power amplifier may be compared. The thermal equilibrium state of the power amplifier may refer to a state in which there is no temperature change in the power amplifier. According to an embodiment, when it is identified that the temperature change amount of the power amplifier is less than or equal to a specific threshold value, it may be identified that the power amplifier reaches the thermal equilibrium state. According to an embodiment, the threshold value for comparing the temperature change amount of the power amplifier may be pre-defined. According to various embodiments of the disclosure, when it is identified that the detected heat change amount of the power amplifier is less than or equal to the threshold value, the process may proceed to operation 930. According to various embodiments, when it is identified that the detected heat change amount of the power amplifier exceeds the threshold value, it is identified that the power amplifier still remains in the thermal diffusion period and the process may resume operation 910.

At operation 930, the base station 110 may identify a period from a start time of a downlink transmission period to a time at which the change amount of the temperature of the power amplifier is less than or equal to the threshold value as a distortion period under the TDD system. According to an embodiment, when a predetermined time is elapsed after downlink transmission starts, if a second section (e.g., a thermal equilibrium period) 709 in which temperature of the power amplifier does not increase anymore is identified, a start time of the thermal equilibrium period may be identified as an end time of the distortion period. The distortion period may be identified based on a state of the power amplifier (e.g., a temperature or thermal expansion coefficient of the power amplifier) or a duration in which the power amplifier reaches a thermal equilibrium state. The distortion period is a period in which compensation information should be applied to the compensator 620, and identifying a period in which solving of distortion characteristics of the power amplifier is not required as a distortion period may cause unnecessary waste. According to an embodiment, the distortion period may have a length of at least one symbol, but is not limited thereto. According to an embodiment, the distortion period may be a period that has a characteristic (e.g., temperature of the power amplifier, a gain or a phase of a signal) value changing with time with reference to the time axis of the TDD system. As described above, compensation information for attenuating distortion characteristics of the power amplifier may be identified based on the identified distortion period.

Figure 10:
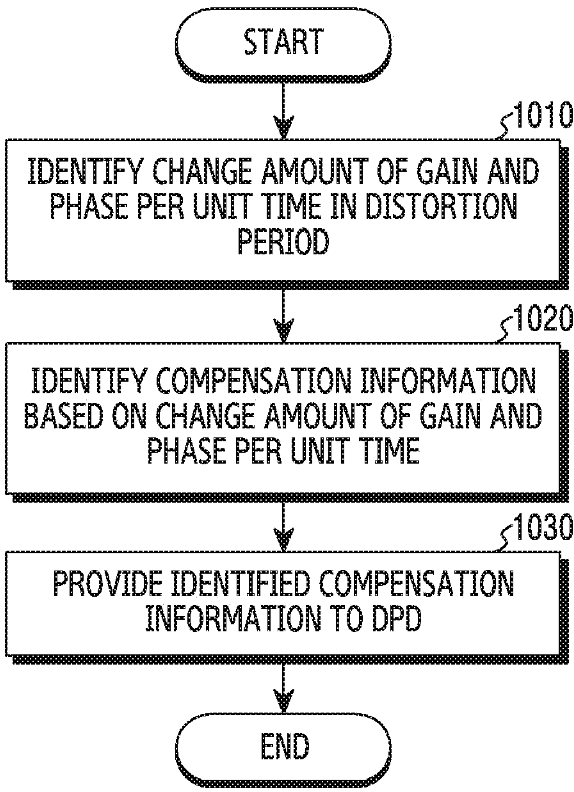
FIG. 10 illustrates an operation flow of a base station device for identifying compensation information for a power amplifier in a distortion period according to an embodiment of the disclosure.

FIG. 10 illustrates an operation flow of a base station for identifying compensation information for a power amplifier in a distortion period according to an embodiment of the disclosure.

Referring to FIG. 10, the base station 110 may identify compensation information for attenuating distortion characteristics of the power amplifier occurring in a distortion period. A compensation value of a gain or a phase applied to the compensator 620 in the distortion period may be identified by compensation information which is identified based on a characteristic value distorted by deterioration of the power amplifier. According to an embodiment, the compensation information may be identified based on at least one of a change amount of a gain, a change amount of a phase, a duration in which the second period (e.g., a thermal equilibrium period) 709 is reached, or a state of the power amplifier (e.g., a temperature or thermal expansion efficient of the power amplifier). According to an embodiment, the compensation information may be identified in relation to a unit time according to the distortion period under the TDD system.

At operation 1010, the base station 110 may identify a change amount of a gain or a phase per unit time in the identified distortion period. According to an embodiment, distortion characteristics of a gain or phase per unit time may occur due to deterioration of the power amplifier. This means a change amount of a gain or a phase per unit symbol or slot under the TDD system. In various embodiments of the disclosure, a change amount of a gain or a phase caused by deterioration of the power amplifier is identified, but this should not be considered as limiting, and a change amount of other parameter caused by a temperature change of the power amplifier may be identified.

At operation 1020, the base station 110 may identify compensation information based on the identified change amount of at least one of the gain or phase per unit time. According to an embodiment, the identified compensation information may be information having the opposite value of the change amount of at least one of the gain or phase per unit time. This is because the compensation information is information that is applied to a signal outputted from the DPD 404 and then offsets distortion characteristics (e.g., a change of a gain or phase) to occur due to deterioration of the power amplifier. According to an embodiment, the compensation information may be identified based on a time (e.g., a symbol or a slot) corresponding to a change of at least one of the gain or phase per unit time un the TDD system. That is, the compensation information may include a compensation value that is identified according to a symbol or a slot in which at least one of the gain or phase is changed. In various embodiments of the disclosure, compensation information for a change of a gain or a phase caused by deterioration of the power amplifier is identified, but this should not be considered as limiting, and a change amount of other parameter caused by a temperature change of the power amplifier may be identified.

At operation 1030, the base station 110 may apply the identified compensation information to a signal outputted from the DPD 404. According to an embodiment, the identified compensation information may include compensation values to compensate for a change amount of at least one of the gain or the phase caused by deterioration of the power amplifier. According to an embodiment, the compensator 620 may apply the compensation value to a downlink signal outputted from the DPD 404 by using the compensation information which is based on distortion characteristics of the power amplifier. According to various embodiments of the disclosure, once compensation information is identified, the compensation information may be applied to the compensator 620 and may be applied to a following downlink signal as a defined constant value. However, this should not be considered as limiting. When continuous signals are inputted, the compensation information may be adaptively refined based on at least one of a state of the power amplifier, a change of a temperature, a change of a signal gain or a change of a signal phase.

As described above, the operation flow of the base station 110 including the compensator 620 for offsetting distortion characteristics caused by deterioration of the power amplifier to improve linearity of the DPD 404 is illustrated. However, this is not limited to the base station 110 and the same compensator 620 and the same operation flow may be applied to uplink signal transmission of the terminal 120.

Figure 11:
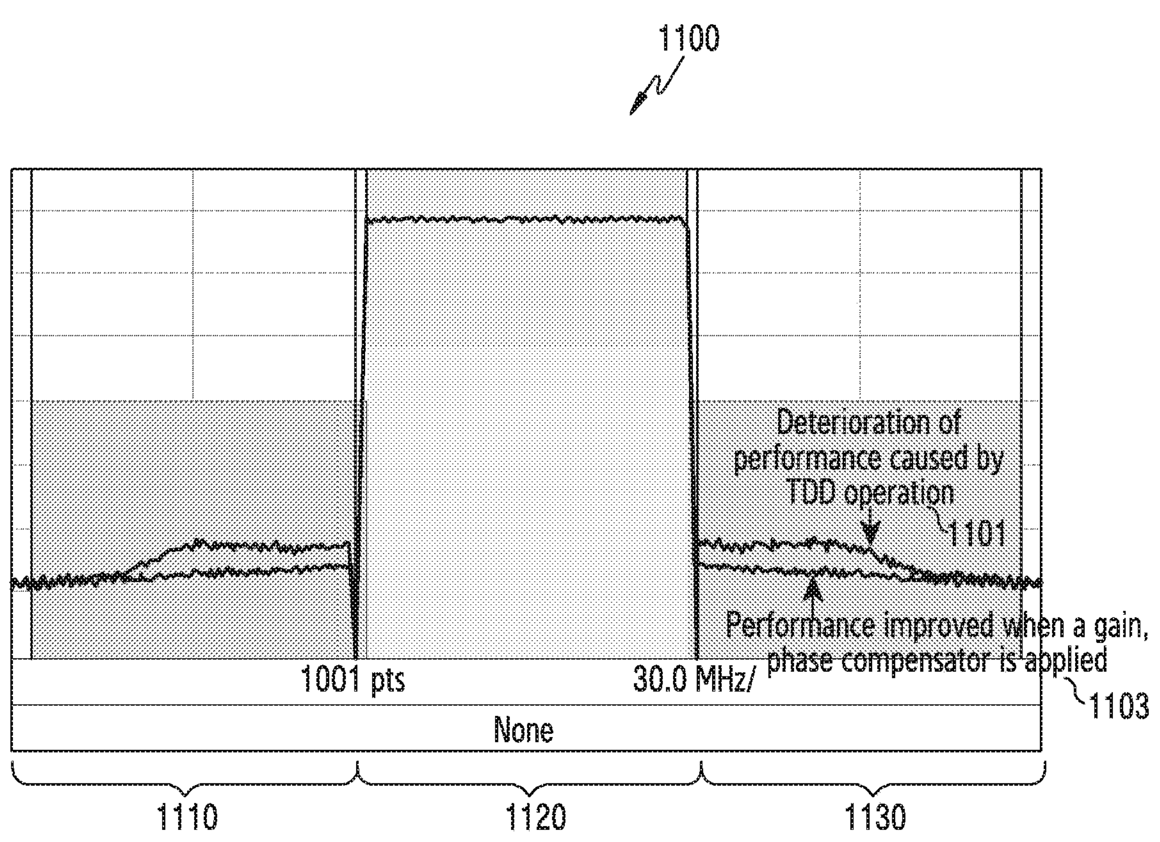
FIG. 11 illustrates an example of reduction of distortion characteristics achieved by a compensator according to an embodiment of the disclosure.

FIG. 11 illustrates an example of reduction of distortion characteristics achieved by a compensator according to an embodiment of the disclosure. Specifically, FIG. 11 illustrates deterioration of output spectrum linearity of the power amplifier.

Referring to FIG. 11, a spectrum 1100 regarding an entire downlink signal transmission period in a frequency domain is illustrated. When quality of signals is degraded due to deterioration of the power amplifier, a spurious component may be generated in a necessary band 1120, a first spurious band 1110 and a second spurious band 1130. On the spectrum, a spurious component generated in the necessary band 1120 may overlap a transmitted downlink signal component and may be difficult to visually measure. On the other hand, a spurious component 1101 generated in the first spurious band 1110 or the second spurious band 1130 may be detected as visible performance deterioration. The spurious component 1101 generated in the first spurious band 1110 or the second spurious band 1130 may be included in unwanted emission with out-of-band emission.

Referring to FIG. 11, performance of the power amplifier may deteriorate according to downlink signal transmission under the TDD system. As performance of the power amplifier deteriorates, quality of a downlink signal may be degraded, which results in generation of a spurious component 1101 on the spectrum. According to various embodiments of the disclosure, the base station 110 may improve performance of the power amplifier by applying compensation information to a downlink signal based on compensation information related to a gain or a phase. As performance of the power amplifier is improved, quality of the downlink signal may be improved, which results in removal of the spurious component on the spectrum (1103). In order to improve signal quality, a signal component should not be generated in a band other than a necessary frequency band, for example, in a frequency spaced apart from a necessary band. According to various embodiments, a downlink signal which attenuates distortion characteristics, caused by deterioration of performance of the power amplifier, by applying the gain or phase compensator 620 may result in removal of the spurious component from the first spurious band 1110 or the second spurious band 1130 (1103).

Figure 12:
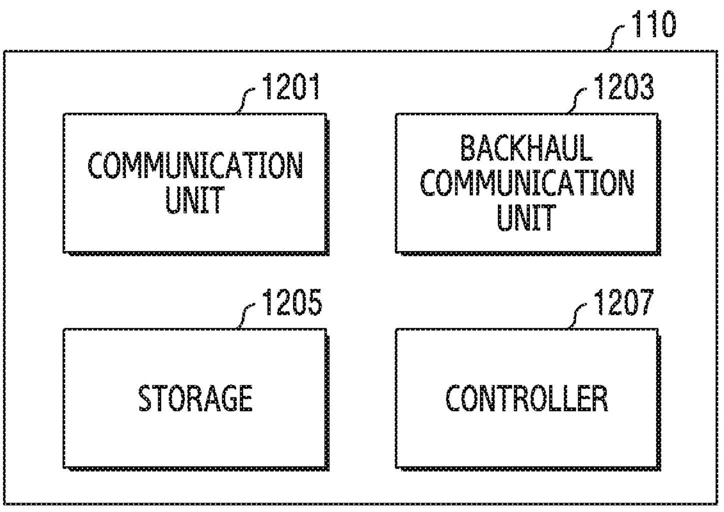
FIG. 12 illustrates a functional configuration of a base station device according to an embodiment of the disclosure.

FIG. 12 illustrates a functional configuration of a base station in a wireless communication system according to an embodiment of the disclosure. The term "unit" or terms ending with suffixes "-er," and "-or" used in the following descriptions refer to a unit processing at least one function or operation, and may be implemented by hardware, software, or a combination of hardware and software.

Referring to FIG. 12, the base station 110 may include a communication unit 1201, a backhaul communication unit 1203, a storage unit 1205, and a controller 1207.

The communication unit 1201 performs functions for transmitting and receiving signals via a wireless channel. For example, the communication unit 1201 may perform a function of converting between a baseband signal and a bit stream according to a physical layer standard of the system. For example, when transmitting data, the communication unit 1201 may generate complex symbols by encoding and modulating a transmission bit stream. In addition, when receiving data, the communication unit 1201 may reconstruct a reception bit stream by demodulating and decoding a baseband signal. The communication unit 1201 may be configured to perform at least one of operations of a transmission end or operations of a reception end described through FIGS. 1, 2A, 2B, 3, 4, 5A, 5B, 6A, 6B, and 7 to 10. According to an embodiment, the communication unit 1201 may be configured to receive an uplink signal from a terminal 120.

The communication unit 1201 may up-convert a baseband signal into a radio frequency (RF) band signal, and then may transmit the signal via an antenna, and may down-convert an RF band signal received via an antenna into a baseband signal. To achieve this, the communication unit 1201 may include a transmission filter, a reception filter, an amplifier, a mixer, an oscillator, a digital to analog converter (DAC), an analog to digital converter (ADC), etc. In addition, the communication unit 1201 may include a plurality of transmission and reception paths. Furthermore, the communication unit 1201 may include at least one antenna array including a plurality of antenna elements. In the hardware aspect, the communication unit 1201 may be configured by a digital unit and an analog unit, and the analog unit may be configured by a plurality of sub-units according to operating power, an operating frequency, etc. According to an embodiment, the communication unit 1201 may include a unit for forming beams, that is, a beamforming unit. For example, the communication unit 1201 may include a massive MIMO unit (MMU) for beamforming.

The communication unit 1201 may transmit and receive signals. To achieve this, the communication unit 1201 may include at least one transceiver. For example, the communication unit 1201 may transmit a synchronization signal, a reference signal, system information, a message, control information, or data. In addition, the communication unit 1201 may perform beamforming. The communication unit 1201 may apply a beamforming weight to a signal in order to give directionality to a signal to transmit or receive according to a configuration of the controller 1207. According to an embodiment, the communication unit 1201 may generate a baseband signal according to a scheduling result and a transmit power calculating result. In addition, a RF unit in the communication unit 1201 may transmit a generated signal through an antenna.

The communication unit 1201 may transmit and receive signals as described above. Accordingly, an entirety or a part of the communication unit 1201 may be referred to as a "transmitter," a "receiver," or a "transceiver." In addition, in the following descriptions, transmitting and receiving via a wireless channel may be used as a meaning including processing by the communication unit 1201 as described above.

The backhaul communication unit 1203 provides an interface for communicating with other nodes in a network. That is, the backhaul communication unit 1203 may convert a bit stream to be transmitted from the base station 110 to another node, for example, another access node, another base station, a higher node, a core network, or the like, into a physical signal, and may convert a physical signal transmitted from another node into a bit stream.

The storage unit 1205 may store data such as a basic program for operations of the base station 110, an application program, configuration information, etc. The storage unit 1205 may include memory. The storage unit 1205 may be configured by volatile memory, nonvolatile memory, or a combination of volatile memory and nonvolatile memory. In addition, the storage unit 1205 provides stored data according to a request of the controller 1207.

The controller 1207 controls overall operations of the base station 110. For example, the controller 1207 may transmit and receive signals via the communication unit 1201 or the backhaul communication unit 1203. In addition, the controller 1207 may write and read out data on and from the storage unit 1205. In addition, the controller 1207 may perform functions of a protocol stack required by communication standards. To achieve this, the controller 1207 may include at least one processor. According to various embodiments, the controller 1207 may control the base station 110 to perform operations according to the above-described embodiments. According to an embodiment, the controller 1207 may estimate an uplink channel.

According to an embodiment, in the wireless communication, the controller 1207 may be configured to acquire a first output signal of the DPD 404, after an uplink period is ended in a time division duplex (TDD) configuration, to identify a distortion period from a start time of a downlink period, to identify compensation information for a power amplifier of the base station 110 in the distortion period, and to provide a signal in which the compensation information is applied to a second output signal of the DPD 404 to the power amplifier.

According to an embodiment, in the wireless communication system, to identify the distortion period from the start time of the downlink period, the controller 1207 may further be configured to detect a temperature of the power amplifier and a temperature change amount, to identify whether the detected temperature change amount is less than or equal to a threshold value, and, when the detected temperature change amount is less than or equal to the threshold value, to identify a period from the start time of the downlink period to a time at which the temperature change amount reaches the threshold value, as the distortion period.

According to an embodiment, in the wireless communication system, to identify the compensation information for the power amplifier of the base station 110 in the distortion period, the controller 1207 may further be configured to identify a change amount of at least one of a gain or a phase per unit time in the distortion period, to identify the compensation information based on the change amount of at least one of the gain or phase per the unit time, and to provide the identified compensation information to the DPD 404.

According to an embodiment, the compensation information may be identified based on at least one of state information of the power amplifier, a gain change amount of the output signal, or a phase change amount of the output signal, and the state information of the power amplifier may be related to at least one piece of information of temperature information or thermal expansion coefficient information of the power amplifier.

According to an embodiment, in the wireless communication system, the controller 1207 may further be configured to store the compensation information in a compensator 620 of the base station 110, to identify another compensation information for the power amplifier of the base station 110 in the distortion period, and to refine the compensation information with the identified other compensation information.

According to an embodiment, the compensation information may be pre-defined in the compensator 620 of the base station 110.

According to an embodiment, in the wireless communication system, the controller 1207 may further be configured to detect a temperature change amount of the power amplifier, and to identify the threshold value based on the detected temperature change amount.

According to an embodiment, the threshold value may be pre-defined in the controller 1207 of the base station 110.

According to an embodiment, the distortion period may be configured by at least one unit of a symbol or a slot in the TDD configuration.

According to an embodiment, the unit time may be at least one of a symbol or a slot in the TDD configuration.

The configuration of the base station 110 illustrated in FIG. 12 is merely an example of the base station 110, and examples of the base station performing various embodiments of the disclosure are not limited from the configuration illustrated in FIG. 12. That is, according to various embodiments, some components may be added, deleted, or changed.

Referring to FIG. 12, the base station 110 is described as one entity, but the disclosure is not limited thereto as described above. The base station 110 according to various embodiments of the disclosure may be implemented to form an access network that has not only an integrated deployment (e.g., eNB of LTE) but also a distributed deployment. As exemplified to explain embodiments of FIGS. 1, 2A, 2B, 3, 4, 5A, 5B, 6A, 6B, and 7 to 10, the base station may be divided into a central unit (CU) and a digital unit (DU), and may be implemented for the CU to perform an upper layer function (e.g., a packet data convergence protocol (PDCP), an RRC), and for the DU to perform a lower layer function (e.g., medium access control (MAC), physical (PHY)).

The base station having the distributed deployment as described above may further include a configuration for fronthaul interface communication. According to an embodiment, the base station may perform functions for transceiving signals in a wired communication environment as a DU. The DU may include a wired interface to control direct connection between devices through a transmission medium (e.g., a copper line, an optical fiber). For example, the DU may deliver an electrical signal to another device through a copper line, or may perform conversion between an electrical signal and an optical signal. The DU may be connected to a CU of a distributed deployment. However, this description is not interpreted as excluding a scenario in which the DU is connected with the CU through a wireless network. In addition, the DU may be additionally connected with a radio unit (RU). However, this description is not interpreted as excluding a wireless environment in which only a CU and a DU are configured.

Figure 13:
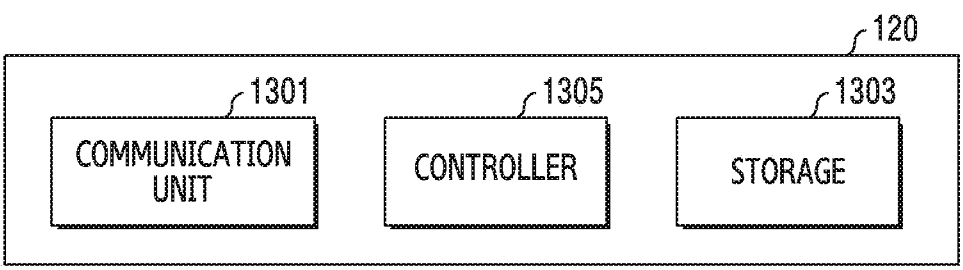
FIG. 13 illustrates a functional configuration of a terminal device according to an embodiment of the disclosure.

FIG. 13 illustrates a functional configuration of a terminal according to an embodiment of the disclosure. The term "unit" or terms ending with suffixes "-er," and "-or" used in the following description refer to a unit processing at least one function or operation, and may be implemented by hardware, software, or a combination of hardware and software.

Referring to FIG. 13, the terminal 120 may include a communication unit 1301, a storage 1303, and a controller 1305.

The communication unit 1301 performs functions for transmitting and receiving signals via a wireless channel. For example, the communication unit 1301 may perform a function of converting between a baseband signal and a bit stream according to a physical layer standard of a system. For example, when transmitting data, the communication unit 1301 may generate complex symbols by encoding and modulating a transmission bit stream. In addition, when receiving data, the communication unit 1301 may reconstruct a reception bit stream by demodulating and decoding a baseband signal. The communication unit 1301 may up-convert a baseband signal into an RF band signal, and then may transmit the signal via an antenna, and may down-convert an RF band signal received via an antenna into a baseband signal. For example, the communication unit 1301 may include a transmission filter, a reception filter, an amplifier, a mixer, an oscillator, a DAC, an ADC, etc.

In addition, the communication unit 1301 may include a plurality of transmission and reception paths. Furthermore, the communication unit 1301 may include an antenna unit. The communication unit 1301 may include at least one antenna array including a plurality of antenna elements. In the hardware aspect, the communication unit 1301 may be configured by a digital circuit and an analog circuit (e.g., a radio frequency integrated circuit (RFIC)). The digital circuit and the analog circuit may be implemented as a single package. In addition, the communication unit 1301 may include a plurality of RF chains. Furthermore, the communication unit 1301 may perform beamforming. The communication unit 1301 may apply a beamforming weight to a signal in order to give directionality to a signal to transmit or receive according to configuration of the controller 1305.

In addition, the communication unit 1301 may transmit and receive signals. To achieve this, the communication unit 1301 may include at least one transceiver. The communication unit 1301 may receive a downlink signal. The downlink signal may include a synchronization signal (SS), a reference signal (RS) (e.g., a cell-specific reference signal (CRS), a demodulation (DM)-RS), system information (e.g., MIB, SIB, remaining system information (RMSI), other system information (OSI)), a configuration message, control information, or downlink data. In addition, the communication unit 1301 may transmit an uplink signal. The uplink signal may include uplink control information (UCI), a random access-related signal (e.g., a random access preamble (RAP) (or message 1 (Msg1)), message 3 (Msg3)), a reference signal (e.g., a sounding reference signal (SRS), a DM-RS), or a buffer status report (BSR). For example, the uplink control information may include at least one of a scheduling request (SR), ACK/NACK information of a hybrid acknowledge (HARQ) procedure, or channel state information (CSI). According to an embodiment, the communication unit 1301 may receive uplink DMRS allocation information. In addition, according to an embodiment, the communication unit 1301 may transmit an uplink DMRS symbol.

Specifically, the communication unit 1301 may include a RF processor and a baseband processor. The RF processor may perform functions for transmitting and receiving signals via a wireless channel, such as signal band conversion, amplification, etc. The RF processor may up-convert a baseband signal provided from the baseband processor into an RF band signal, and then may transmit the signal via an antenna, and may down-convert an RF band signal received via the antenna into a baseband signal. For example, the RF processor may include a transmission filter, a reception filter, an amplifier, a mixer, an oscillator, a digital to analog converter (DAC), an analog to digital converter (ADC). The terminal 120 may include one or more antennas. The RF processor may include a plurality of RF chains. Furthermore, the RF processor may perform beamforming. For the beamforming, the RF processor may adjust a phase and a size of each of the signals transmitted and received through the plurality of antennas or antenna elements.

The baseband processor may perform a function of converting between a baseband signal and a bit stream according to a physical layer specification of a system. For example, when transmitting data, the baseband processor may generate complex symbols by encoding and modulating a transmission bit stream. In addition, when receiving data, the baseband processor may reconstruct a reception bit stream by demodulating and decoding a baseband signal provided from the RF processor. For example, when transmitting data according to an orthogonal frequency division multiplexing (OFDM) method, the baseband processor may generate complex symbols by encoding and modulating a transmission bit stream, may map the complex symbols onto subcarriers, and then, may construct OFDM symbols through inverse fast Fourier transform (IFFT) operation and cyclic prefix (CP) insertion. In addition, when receiving data, the baseband processor may divide a baseband signal provided from the RF processor in the unit of an OFDM symbol, may reconstruct signals mapped onto subcarriers through fast Fourier transform (FFT) operation, and then, may reconstruct a reception bit stream by demodulating and decoding.

The communication unit 1301 may transmit and receive signals as described above. Accordingly, an entirety or part of the communication unit 1301 may be referred to as "transmitter," "receiver," or "transceiver." Furthermore, the communication unit 1301 may include a plurality of communication modules to support a plurality of different radio access technologies. In addition, the communication unit 1301 may include different communication modules to process signals of different frequency bands. For example, the different radio access technologies may include a wireless LAN (e.g., IEEE 802.1x), cellular network (e.g., long term evolution (LTE), new radio (NR)), etc. In addition, the different frequency bands may include a super high frequency (SHF) (e.g., 2.5 GH, 5 Ghz) band, a millimeter wave (e.g., 60 GHz) band. In addition, the communication unit 1301 may use a radio access technology of the same scheme on different frequency bands (e.g., a unlicensed band for licensed assisted access (LAA) or NR-unlicensed (NR-U), a citizens broadband radio service (CBRS) (e.g., 3.5 GHz)).

The storage 1303 may store data such as a basic program for operations of the terminal 120, an application program, configuration information, or the like. The storage 1303 may be configured by volatile memory, nonvolatile memory, or a combination of volatile memory and nonvolatile memory. The storage 1303 may store data such as a basic program for operations of the terminal 120, an application program, configuration information, or the like.

The controller 1305 controls overall operations of the terminal 120. For example, the controller 1305 may transmit and receive signals via the communication unit 1301. In addition, the controller 1305 may write and read out data on and from the storage 1303. In addition, the controller 1305 may perform functions of a protocol stack required by communication standards. To achieve this, the controller 1305 may include at least one processor. The controller 1305 may include at least one processor or micro-processor, or may be a part of a processor. In addition, a part of the communication unit 1301 and the controller 1305 may be referred to as a communication processor (CP). The controller 1305 may include various modules for performing communication. According to various embodiments, the controller 1305 may control the terminal 120 to perform operations according to various embodiments, which will be described below.

The controller 1305 controls overall operations of the terminal 120. For example, the controller 1305 may transmit and receive signals via the communication unit 1301. In addition, the controller 1305 may write and read out data on and from the storage 1303. To achieve this, the controller 1305 may include at least one processor. For example, the controller 1305 may include a communication processor (CP) to perform control for communication, and an application processor (AP) to control a higher layer such as an application program. According to various embodiments, the controller 1305 may be configured to perform a function of sharing a dynamic spectrum. According to an embodiment, the controller 1305 may be configured for the terminal 120 to dynamically use a cell of LTE and a cell of NR in an EN-DC environment. In addition, according to an embodiment, the controller 1305 may be configured for the terminal 120 to dynamically use cells by two nodes not only in an EN-DC environment but also in a MR-DC environment. In addition, the controller 1305 may control the terminal 120 to perform operations according to the above-described various embodiments.

According to an embodiment, in the wireless communication, the controller 1305 may be configured to acquire a first output signal of the DPD 404, after an uplink period is ended in a time division duplex (TDD) configuration, to identify a distortion period from a start time of a downlink period, to identify compensation information for a power amplifier of the terminal 120 in the distortion period, and to provide a signal in which the compensation information is applied to a second output signal of the DPD 404 to the power amplifier.

According to an embodiment, in the wireless communication system, to identify the distortion period from the start time of the downlink period, the controller 1305 may further be configured to detect a temperature of the power amplifier and a temperature change amount, to identify whether the detected temperature change amount is less than or equal to a threshold value, and, when the detected temperature change amount is less than or equal to the threshold value, to identify a period from the start time of the downlink period to a time at which the temperature change amount reaches the threshold value, as the distortion period.

According to an embodiment, in the wireless communication system, to identify the compensation information for the power amplifier of the terminal 120 in the distortion period, the controller 1305 may further be configured to identify a change amount of at least one of a gain or a phase per unit time in the distortion period, to identify the compensation information based on the change amount of at least one of the gain or phase per the unit time, and to provide the identified compensation information to the DPD 404.

According to an embodiment, the compensation information may be identified based on at least one of state information of the power amplifier, a gain change amount of the output signal, or a phase change amount of the output signal, and the state information of the power amplifier may be related to at least one piece of information of temperature information or thermal expansion coefficient information of the power amplifier.

According to an embodiment, in the wireless communication system, the controller 1305 may further be configured to store the compensation information in a compensator 620 of the terminal 120, to identify another compensation information for the power amplifier of the terminal 120 in the distortion period, and to refine the compensation information with the identified other compensation information.

According to an embodiment, the compensation information may be pre-defined in the compensator 620 of the terminal 120.

According to an embodiment, in the wireless communication system, the controller 1305 may further be configured to detect a temperature change amount of the power amplifier, and to identify the threshold value based on the detected temperature change amount.

According to an embodiment, the threshold value may be pre-defined in the controller 1305 of the terminal 120.

According to an embodiment, the distortion period may be configured by at least one unit of a symbol or a slot in the TDD configuration.

According to an embodiment, the unit time may be at least one of a symbol or a slot in the TDD configuration.

In the disclosure, various indexes may be used to indicate channel quality. Channel quality may include at least one of reference signal received power (RSRP), reference signal received quality (RSRQ), beam reference signal received power (BRSRP), received signal strength indicator (RSRI), signal and noise ratio (SNR), signal to interference and noise ratio (SINR), carrier to interference and noise ratio (CINR), error vector magnitude (EVM), bit error rate (BER), block error rate (BLER). In addition, in addition to the above-described examples, other terms having the same technical meaning, or other metrics indicating channel quality may be used. In the disclosure, optimal channel quality may refer to high channel quality. High channel quality may mean that a size of an index related to a strength of a signal is great, and low channel quality may mean that the size of the index is low. Regarding an index related to an error rate (e.g., EVM, BER, BLER), as a size of the index is smaller, relatively higher channel quality may be guaranteed.

According to various embodiments of the disclosure, a method performed by a base station 110 in a wireless communication system may include: acquiring a first output signal of digital predistortion (DPD) 404; after an uplink period is ended in a time division duplex (TDD) configuration, identifying a distortion period from a start time of a downlink period; identifying compensation information for a power amplifier of the base station 110 in the distortion period; and providing a signal in which the compensation information is applied to a second output signal of the DPD to the power amplifier.

According to an embodiment, in the wireless communication system, the method performed by the base station 110 may further include: detecting a temperature of the power amplifier and a temperature change amount; identifying whether the detected temperature change amount is less than or equal to a threshold value; and, when the detected temperature change amount is less than or equal to the threshold value, identifying a period from the start time of the downlink period to a time at which the temperature change amount reaches the threshold value, as the distortion period.

According to an embodiment, in the wireless communication system, the method performed by the base station 110 may further include: identifying a change amount of at least one of a gain or a phase per unit time in the distortion period; identifying the compensation information based on the change amount of at least one of the gain or phase per the unit time; and providing the identified compensation information to the DPD 404.

According to an embodiment, the compensation information may be identified based on at least one of state information of the power amplifier, a gain change amount of the output signal, or a phase change amount of the output signal, and the state information of the power amplifier may be related to at least one piece of information of temperature information or thermal expansion coefficient information of the power amplifier.

According to an embodiment, in the wireless communication system, the method performed by the base station 110 may further include: storing the compensation information in a compensator 620 of the base station 110; identifying another compensation information for the power amplifier of the base station 110 in the distortion period; and refining the compensation information with the identified other compensation information.

According to an embodiment, the compensation information may be pre-defined in a compensator 620 of the base station 110.

According to an embodiment, in the wireless communication system, the method performed by the base station 110 may further include: detecting a temperature change amount of the power amplifier; and identifying the threshold value based on the detected temperature change amount.

According to an embodiment, the threshold value is pre-defined in a controller of the base station 110.

According to an embodiment, the distortion period may be configured by at least one unit of a symbol or a slot in the TDD configuration.

According to an embodiment, the unit time may be at least one of a symbol or a slot in the TDD configuration.

Methods based on the claims or the embodiments disclosed in the disclosure may be implemented in hardware, software, or a combination of both.

When implemented in software, a computer readable storage medium for storing one or more programs (software modules) may be provided. The one or more programs stored in the computer readable storage medium are configured for execution performed by one or more processors in an electronic device. The one or more programs include instructions for allowing the electronic device to execute the methods based on the claims or the embodiments disclosed in the disclosure.

The program (the software module or software) may be stored in random access memory, non-volatile memory including flash memory, read only memory (ROM), electrically erasable programmable read only memory (EEPROM), a magnetic disc storage device, a compact disc-ROM (CD-ROM), digital versatile discs (DVDs) or other forms of optical storage devices, and a magnetic cassette. Alternatively, the program may be stored in memory configured in combination of all or some of these storage media. In addition, the configured memory may be plural in number.

Further, the program may be stored in an attachable storage device capable of accessing the electronic device through a communication network such as the Internet, an Intranet, a local area network (LAN), a wide LAN (WLAN), or a storage area network (SAN) or a communication network configured by combining the networks. The storage device may access via an external port to a device which performs the embodiments of the disclosure. In addition, an additional storage device on a communication network may access to a device which performs the embodiments of the disclosure.

In the above-described specific embodiments of the disclosure, elements included in the disclosure are expressed in singular or plural forms according to specific embodiments. However, singular or plural forms are appropriately selected according to suggested situations for convenience of explanation, and the disclosure is not limited to a single element or plural elements. An element which is expressed in a plural form may be configured in a singular form or an element which is expressed in a singular form may be configured in plural number.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A method performed by a base station in a wireless communication system, the method comprising:

acquiring a first output signal of digital predistortion (DPD);

after an uplink period is ended in a time division duplex (TDD) configuration, identifying a distortion period from a start time of a downlink period;
identifying compensation information for a power amplifier of the base station in the distortion period; and
providing a signal in which the compensation information is applied to a second output signal of the DPD to the power amplifier.

2. The method of claim 1, wherein the identifying of the distortion period from the start time of the downlink period further comprises:
detecting a temperature of the power amplifier and a temperature change amount;
identifying whether the detected temperature change amount is less than or equal to a threshold value; and
when the detected temperature change amount is less than or equal to the threshold value, identifying a period from the start time of the downlink period to a time at which the temperature change amount reaches the threshold value, as the distortion period.

3. The method of claim 1, wherein the identifying of the compensation information for the power amplifier of the base station in the distortion period further comprises:
identifying a change amount of at least one of a gain or a phase per unit time in the distortion period;
identifying the compensation information based on the change amount of at least one of the gain or phase per the unit time; and
providing the identified compensation information to the DPD.

4. The method of claim 1,
wherein the compensation information is identified based on at least one of state information of the power amplifier, a gain change amount of the first output signal or the second output signal, or a phase change amount of the first output signal or the second output signal, and
wherein the state information of the power amplifier is related to at least one piece of information of temperature information or thermal expansion coefficient information of the power amplifier.

5. The method of claim 1, further comprising:
storing the compensation information in a compensator of the base station;
identifying another compensation information for the power amplifier of the base station in the distortion period; and
refining the compensation information with the identified other compensation information.

6. The method of claim 1, wherein the compensation information is pre-defined in a compensator of the base station.

7. The method of claim 2, further comprising:
detecting the temperature change amount of the power amplifier; and
identifying the threshold value based on the detected temperature change amount.

8. The method of claim 2, wherein the threshold value is pre-defined in a controller of the base station.

9. The method of claim 1, wherein the distortion period is configured by at least one unit of a symbol or a slot in the TDD configuration.

10. The method of claim 3, wherein the distortion period is configured by at least one unit of a symbol or a slot in the TDD configuration.

11. A base station in a wireless communication system, the base station comprising:
a transceiver;
a processor; and
memory storing instructions that, when executed by the processor, cause the base station to:
acquire a first output signal of digital predistortion (DPD),
after an uplink period is ended in a time division duplex (TDD) configuration, identify a distortion period from a start time of a downlink period,
identify compensation information for a power amplifier of the base station in the distortion period, and
provide a signal in which the compensation information is applied to a second output signal of the DPD to the power amplifier.

12. The base station of claim 11, wherein, to identify the distortion period from the start time of the downlink period, the instructions that, when executed by the processor, cause the base station to:
detect a temperature of the power amplifier and a temperature change amount,
identify whether the detected temperature change amount is less than or equal to a threshold value, and
when the detected temperature change amount is less than or equal to the threshold value, identify a period from the start time of the downlink period to a time at which the temperature change amount reaches the threshold value, as the distortion period.

13. The base station of claim 11, wherein, to identify the compensation information for the power amplifier of the base station in the distortion period, the instructions that, when executed by the processor, cause the base station to:
identify a change amount of at least one of a gain or a phase per unit time in the distortion period,
identify the compensation information based on the change amount of at least one of the gain or phase per the unit time, and
provide the identified compensation information to the DPD.

14. The base station of claim 11,
wherein the compensation information is identified based on at least one of state information of the power amplifier, a gain change amount of the first output signal or the second output signal, or a phase change amount of the first output signal or the second output signal, and
wherein the state information of the power amplifier is related to at least one piece of information of temperature information or thermal expansion coefficient information of the power amplifier.

15. The base station of claim 11, wherein the instructions that, when executed by the processor, cause the base station to:
store the compensation information in a compensator of the base station,
identify another compensation information for the power amplifier of the base station in the distortion period, and
refine the compensation information with the identified other compensation information.

16. The base station of claim 11, wherein the compensation information is pre-defined in a compensator of the base station.

17. The base station of claim 12, wherein the instructions that, when executed by the processor, cause the base station to:
detect the temperature change amount of the power amplifier, and identify the threshold value based on the detected temperature change amount.

18. The base station of claim 12, wherein the threshold value is pre-defined in a controller of the base station.

19. The base station of claim 11, wherein the distortion period is configured by at least one unit of a symbol or a slot in the TDD configuration.

20. The base station of claim 13, wherein the distortion period is configured by at least one unit of a symbol or a slot in the TDD configuration.

* * * * *